United States Patent
Patchava et al.

(10) Patent No.: US 12,500,804 B2
(45) Date of Patent: Dec. 16, 2025

(54) POWER HARVESTING USING A MULTI-TONE ENERGY WAVEFORM

(71) Applicant: QUALCOMM Incorporated, San Diego, CA (US)

(72) Inventors: Raviteja Patchava, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 18/334,130

(22) Filed: Jun. 13, 2023

(65) Prior Publication Data
US 2024/0422039 A1     Dec. 19, 2024

(51) Int. Cl.
*H04L 27/26* (2006.01)
*H04W 72/04* (2023.01)

(52) U.S. Cl.
CPC ......... *H04L 27/2614* (2013.01); *H04W 72/04* (2013.01)

(58) Field of Classification Search
CPC ............. H04L 27/2614; H04L 41/0894; H04L 41/0897; H04L 41/122; H04L 41/40; H04L 45/76; H04W 72/04; H04W 72/53; H04W 72/21; H04W 72/0493; H04W 72/0413; H04W 72/042; H04W 72/0466; H04W 88/085; H04W 72/23

See application file for complete search history.

(56) References Cited

U.S. PATENT DOCUMENTS

| | | | |
|---|---|---|---|
| 2021/0321407 A1* | 10/2021 | Matsuo | H04L 41/0897 |
| 2023/0345513 A1* | 10/2023 | Ivarsson | H04W 72/29 |
| 2024/0114505 A1* | 4/2024 | Tiirola | H04W 52/365 |

OTHER PUBLICATIONS

EP_4346156_A1 (Year: 2024).*

\* cited by examiner

*Primary Examiner* — Rushil P. Sampat
(74) *Attorney, Agent, or Firm* — Holland & Hart LLP

(57) ABSTRACT

Methods, systems, and devices for wireless communications are described. A distributed unit (DU) may output to a radio unit (RU), a data waveform and an initial resource allocation for the data waveform. The RU may generate and transmit to the DU a peak-to-average power ratio (PAPR) for the data waveform and a peak power value for a transmission time interval (TTI). Based on the PAPR and the peak power value, the DU generate and forward to the RU a multiplexed signal. The multiplexed signal may include the data waveform associated with a first resource allocation and comprising a multi-tone energy waveform associated with a second resource allocation. In some examples, the multi-tone energy waveform may be used for power harvesting operations at one or more ambient wireless devices. The RU may transmit the multiplexed signal to one or more wireless devices.

30 Claims, 13 Drawing Sheets

POWER HARVESTING USING A MULTI-TONE ENERGY WAVEFORM

FIELD OF TECHNOLOGY

The following relates to wireless communications, including power harvesting using a multi-tone energy waveform.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support power harvesting using a multi-tone energy waveform. For example, the described techniques enable a network entity to perform a closed loop multi-sine waveform operation that allocates resources for both a multi-tone energy waveform and a data waveform in accordance with the transmission capabilities of a power amplifier (PA). For example, the network entity may dedicate a set of resources that span a transmission time interval (TTI). A distributed unit (DU) of the network entity may allocate an initial subset of resources from the set of resources to a data waveform and indicate the data waveform and the initial resource allocation to a radio unit (RU) of the network entity. The RU may transmit, in response to the DU, a peak-to-average power ratio (PAPR) for the data waveform and a peak power value for the TTI associated with the capabilities of the PA. As such, the DU may use the PAPR and the peak power value of the TTI to determine a second subset of resources to allocate for the multi-tone energy waveform. The DU may output to the RU a multiplexed waveform that includes the data waveform carried on the initial subset of resources and the multi-tone energy waveform carried on the second subset of resources, and the RU may transmit the multiplexed waveform to one or more wireless devices during the TTI.

A method for wireless communications is described. The method may include outputting, to a RU, a data waveform and an initial resource allocation for the data waveform, the initial resource allocation spanning a set of resource blocks (RBs) within a TTI, obtaining, from the RU, a peak power value associated with the TTI and information associated with a PAPR that is based on the data waveform and the initial resource allocation for the data waveform, and outputting, to the RU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR.

A DU for wireless communications is described. The DU may include one or more memories storing processor-executable code, and one or more processors coupled with the one or more memories. The one or more processors may individually or collectively operable to execute the code to cause the DU to output, to a RU, a data waveform and an initial resource allocation for the data waveform, the initial resource allocation span a set of RBs within a TTI, obtain, from the RU, a peak power value associated with the TTI and information associated with a PAPR that is based on the data waveform and the initial resource allocation for the data waveform, and output, to the RU, a multiplexed waveform for the TTI include the data waveform associated with a first resource allocation and including a multi-tone energy waveform associated with a second resource allocation, where the first resource allocation and the second resource allocation are based on the peak power value associated with the TTI and the information associated with the PAPR.

Another DU for wireless communications is described. The DU may include means for outputting, to a RU, a data waveform and an initial resource allocation for the data waveform, the initial resource allocation spanning a set of RBs within a TTI, means for obtaining, from the RU, a peak power value associated with the TTI and information associated with a PAPR that is based on the data waveform and the initial resource allocation for the data waveform, and means for outputting, to the RU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR.

A non-transitory computer-readable medium storing code for wireless communications is described. The code may include instructions executable by a processor to outputting, to a RU, a data waveform and an initial resource allocation for the data waveform, the initial resource allocation span a set of RBs within a TTI, obtain, from the RU, a peak power value associated with the TTI and information associated with a PAPR that is based on the data waveform and the initial resource allocation for the data waveform, and outputting, to the RU, a multiplexed waveform for the TTI include the data waveform associated with a first resource allocation and including a multi-tone energy waveform associated with a second resource allocation, where the first resource allocation and the second resource allocation are based on the peak power value associated with the TTI and the information associated with the PAPR.

Some examples of the method, DU, and non-transitory computer-readable medium described herein may further include operations, features, means, or instructions for allocating a first quantity of RBs of the set of RBs as the initial resource allocation for the data waveform, where the first quantity of RBs may be based on a quantity of data for the data waveform, a modulation and coding scheme (MCS) associated with the data waveform, or both and allocating a second quantity of RBs of the set of RBs as the second resource allocation for the multi-tone energy waveform, where the second quantity of RBs may be based on the peak power value associated with the TTI and the information associated with the PAPR.

In some examples of the method, DU, and non-transitory computer-readable medium described herein, the initial resource allocation may be allocated as the first resource allocation based on a sum of the first quantity of RBs and the second quantity of RBs satisfying a threshold quantity of RBs of the set of RBs.

In some examples of the method, DU, and non-transitory computer-readable medium described herein, a sum of the first quantity of RBs and the second quantity of RBs may be less than a threshold quantity of RBs of the set of RBs and the method, DU, and non-transitory computer-readable medium may include further operations, features, means, or instructions for allocating both the first quantity of RBs of the initial resource allocation of the data waveform and a remaining quantity of RBs of the set of RBs as the first resource allocation of the data waveform.

In some examples of the method, DUs, and non-transitory computer-readable medium described herein, the multi-tone energy waveform may be energy harvesting for a passive wireless device and the data waveform may be for a user equipment (UE).

In some examples of the method, DUs, and non-transitory computer-readable medium described herein, the multi-tone energy waveform includes multiple sinusoidal waveforms for energy harvesting for a passive wireless device and each sinusoidal waveform of the multiple sinusoidal waveforms includes a respective frequency associated with a respective resource of the second resource allocation.

In some examples of the method, DUs, and non-transitory computer-readable medium described herein, the TTI may be a duration of a single symbol.

A method for wireless communications is described. The method may include receiving, from a DU, a data waveform and an initial resource allocation for the data waveform, the initial resource allocation spanning a set of RBs within a TTI, transmitting, to the DU, a peak power value associated with the TTI and information associated with a PAPR that is based on the data waveform and the initial resource allocation for the data waveform, receiving, from the DU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR, and transmitting, during the TTI, the multiplexed waveform to one or more wireless devices.

An RU for wireless communications is described. The RU may include one or more memories storing processor-executable code, and one or more processors coupled with the one or more memories. The one or more processors may individually or collectively operable to execute the code to cause the RU to receive, from a DU, a data waveform and an initial resource allocation for the data waveform, the initial resource allocation spanning a set of RBs within a TTI, transmit, to the DU, a peak power value associated with the TTI and information associated with a PAPR that is based on the data waveform and the initial resource allocation for the data waveform, receive, from the DU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR, and transmit, during the TTI, the multiplexed waveform to one or more wireless devices.

Another RU for wireless communications is described. The RU may include means for receiving, from a DU, a data waveform and an initial resource allocation for the data waveform, the initial resource allocation spanning a set of RBs within a TTI, means for transmitting, to the DU, a peak power value associated with the TTI and information associated with a PAPR that is based on the data waveform and the initial resource allocation for the data waveform, means for receiving, from the DU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR, and means for transmitting, during the TTI, the multiplexed waveform to one or more wireless devices.

A non-transitory computer-readable medium storing code for wireless communications is described. The code may include instructions executable by a processor to receive, from a DU, a data waveform and an initial resource allocation for the data waveform, the initial resource allocation spanning a set of RBs within a TTI, transmit, to the DU, a peak power value associated with the TTI and information associated with a PAPR that is based on the data waveform and the initial resource allocation for the data waveform, receive, from the DU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR, and transmit, during the TTI, the multiplexed waveform to one or more wireless devices.

Some examples of the method, RUs, and non-transitory computer-readable medium described herein may further include operations, features, means, or instructions for generating the PAPR for the data waveform and the initial resource allocation for the data waveform and generating, after generating the PAPR, the peak power value of the TTI based on a power saturation value of a PA and a power backoff value of the PA.

Some examples of the method, RUs, and non-transitory computer-readable medium described herein may further include operations, features, means, or instructions for applying a beamforming vector associated with the data waveform to one or more antennas of the RU, where generating the PAPR for the data waveform and the initial resource allocation for the data waveform occurs after and may be based on applying the beamforming vector.

In some examples of the method, RUs, and non-transitory computer-readable medium described herein, the PAPR includes a respective value associated with each respective antenna of the one or more antennas of the RU and the multi-tone energy waveform includes a respective energy waveform associated with each respective antenna of the one or more antennas of the RU.

In some examples of the method, RUs, and non-transitory computer-readable medium described herein, the power backoff value of the PA may be based on a MCS associated with the data waveform.

Some examples of the method, RUs, and non-transitory computer-readable medium described herein may further include operations, features, means, or instructions for performing, via a PA of the RU, power amplification of the multiplexed waveform to a power value, where the power value satisfies the peak power value of the TTI.

Some examples of the method, RUs, and non-transitory computer-readable medium described herein may further include operations, features, means, or instructions for transmitting, to the one or more wireless devices, control signaling that indicates the first resource allocation for the data waveform for the TTI.

In some examples of the method, RUs, and non-transitory computer-readable medium described herein, transmitting the control signaling may include operations, features, means, or instructions for transmitting the control signaling via a physical downlink control channel (PDCCH) grant, an passive wireless device grant, or both.

In some examples of the method, RUs, and non-transitory computer-readable medium described herein, the multi-tone energy waveform may be energy harvesting for a passive wireless device and the data waveform may be for a UE.

In some examples of the method, RUs, and non-transitory computer-readable medium described herein, the multi-tone energy waveform includes multiple sinusoidal waveforms for energy harvesting for a passive wireless device and each sinusoidal waveform of the multiple sinusoidal waveforms includes a respective frequency associated with a respective resource of the second resource allocation.

In some examples of the method, RUs, and non-transitory computer-readable medium described herein, the TTI may be a duration of a single symbol.

DETAILED DESCRIPTION

Figure 1:
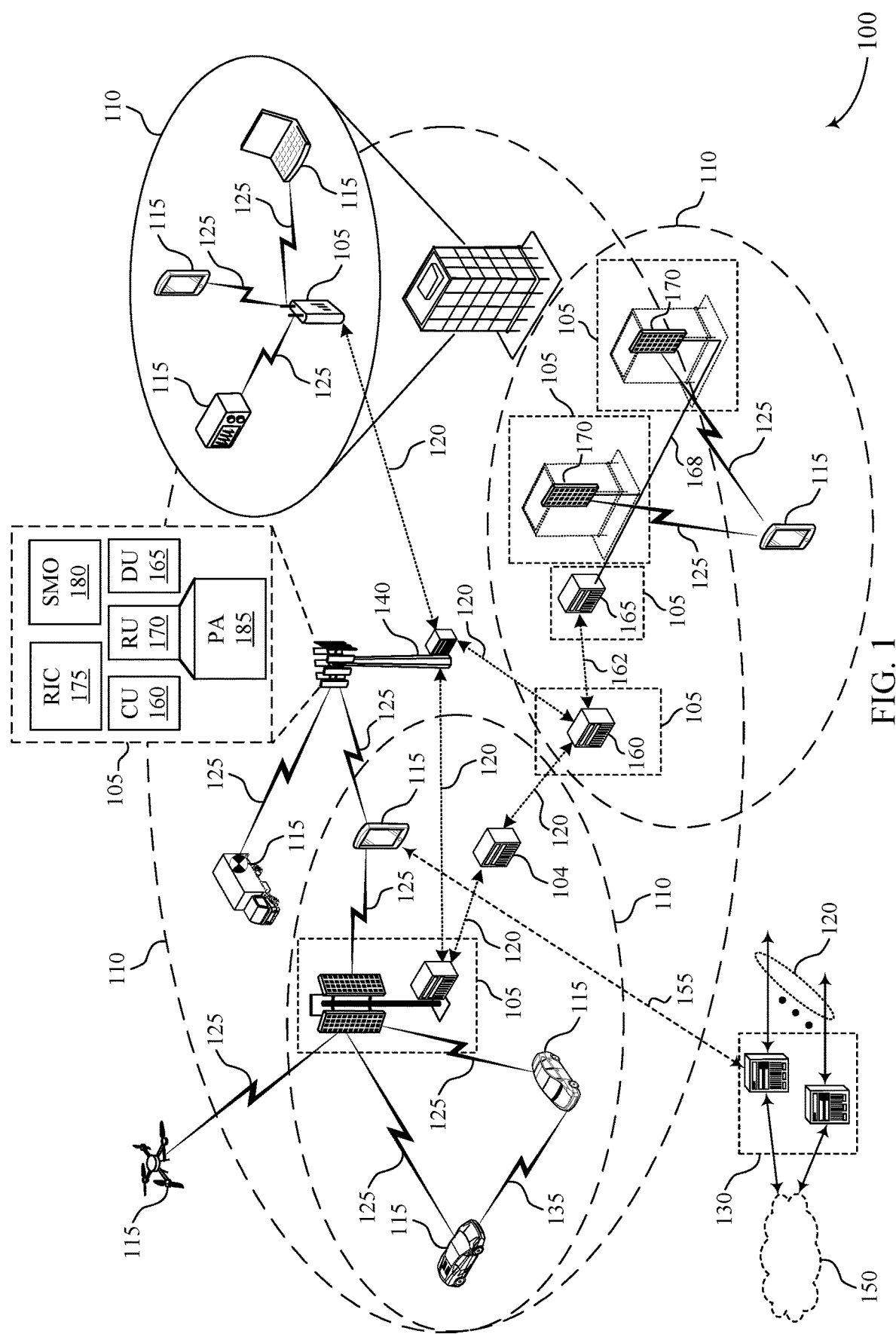
FIG. 1 shows an example of a wireless communications system that supports power harvesting using a multi-tone energy waveform in accordance with one or more aspects of the present disclosure.

In some examples of wireless communications, an ambient wireless device (e.g., an internet of things (IoT) device, a passive wireless device, a semi-active wireless device) may receive a continuous waveform in accordance with energy harvesting techniques. A continuous waveform may be an example of an energy waveform that modulates a singular frequency tone. A network entity may transmit the continuous waveform to the ambient wireless device, and the ambient wireless device may use the energy received from the continuous waveform to perform one or more operations or to store the energy for later use. In some cases, however, the network entity may transmit an energy waveform that spans multiple frequency tones. For example, the network entity may concurrently transmit a same signal over multiple frequency tones (e.g., a multi-tone energy waveform that includes multiple sinusoidal signals). In some cases, however, the peak energy of the multi-tone energy waveform may surpass one or more transmission capabilities of the network entity. For example, the network entity may include a power amplifier (PA) and if the peak power of a multi-tone energy waveform is greater than a configured peak power level of the PA, the multi-tone energy waveform may experience clipping. In some instances, clipping may result in a distortion of the multi-tone energy waveform, which reduces the total energy of the multi-tone energy waveform and the energy able to be harvested at the ambient wireless device.

According to the techniques described herein, the network entity may perform a closed loop multi-sine waveform operation that allocates resources for both multi-tone energy waveforms and data waveforms in accordance with the transmission capabilities of the PA. For example, the network entity may dedicate a set of resources that span a transmission time interval (TTI). A distributed unit (DU) of the network entity may allocate an initial subset of resources from the set of resources to a data waveform and indicate the data waveform and the initial resource allocation to a radio unit (RU) of the network entity. The RU may transmit, in response to the DU, a peak-to-average power ratio (PAPR) for the data waveform and a peak power value for the TTI associated with the capabilities of the PA. The DU may use the PAPR and the peak power value of the TTI to determine a second subset of resources to allocate for the multi-tone energy waveform. The DU may proceed to output to the RU a multiplexed waveform that includes the data waveform carried on the initial subset of resources and the multi-tone energy waveform carried on the second subset of resources. As such, the RU may transmit the multiplexed waveform to one or more wireless devices during the TTI.

Aspects of the disclosure are initially described in the context of wireless communications systems, network architecture, a closed loop multi-sine waveform procedure, and a process flow. Aspects of the disclosure are further illustrated by and described with reference to apparatus diagrams, system diagrams, and flowcharts that relate to power harvesting using a multi-tone energy waveform.

FIG. 1 shows an example of a wireless communications system 100 that supports power harvesting using a multi-tone energy waveform in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a DU 165, an RU 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)). In some examples, an RU 170 may include a PA 185. The RU 170 may use the PA 185 to amplify a transmit power output for one or more wireless communications signals.

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support power harvesting using a multi-tone energy waveform as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of wireless communications system 100, an ambient wireless device may receive a continuous waveform in accordance with energy harvesting techniques. In some cases, however, a network entity 105 may transmit to the ambient wireless device an energy waveform that spans multiple frequency tones in accordance with energy harvesting. For example, the network entity 105 may concurrently transmit a same signal over multiple frequency tones (e.g., a multi-tone energy waveform that includes multiple sinusoidal signals). In some cases, however, a peak energy of the multi-tone energy waveform may surpass one or more transmission capabilities of the network entity 105. For example, the network entity 105 may include a PA and if the peak power of a multi-tone energy waveform is greater than a configured peak power level of the PA, the multi-tone energy waveform may experience clipping.

According to the techniques described herein, the network entity 105 may perform a closed loop multi-sine waveform operation that allocates resources for both multi-tone energy waveforms and data waveforms in accordance with the transmission capabilities of the PA. For example, the network entity 105 may dedicate a set of resources that span a TTI. As such, a DU 165 of the network entity 105 may allocate an initial subset of resources from the set of resources to a data waveform and indicate the data waveform and the initial resource allocation to a RU 170 of the network entity 105. The RU 170 may transmit, in response to the DU 165, a PAPR for the data waveform and a peak power value for the TTI associated with the capabilities of the PA. As such, the DU 165 may use the PAPR and the peak power value of the TTI to determine a second subset of resources to allocate for the multi-tone energy waveform. The DU 165 may proceed to output to the RU 170 a multiplexed waveform that includes the data waveform carried on the first subset of resources and the multi-tone energy waveform carried on the second subset of resources. As such, the RU 170 may transmit the multiplexed waveform to one or more wireless devices during the TTI.

Figure 2:
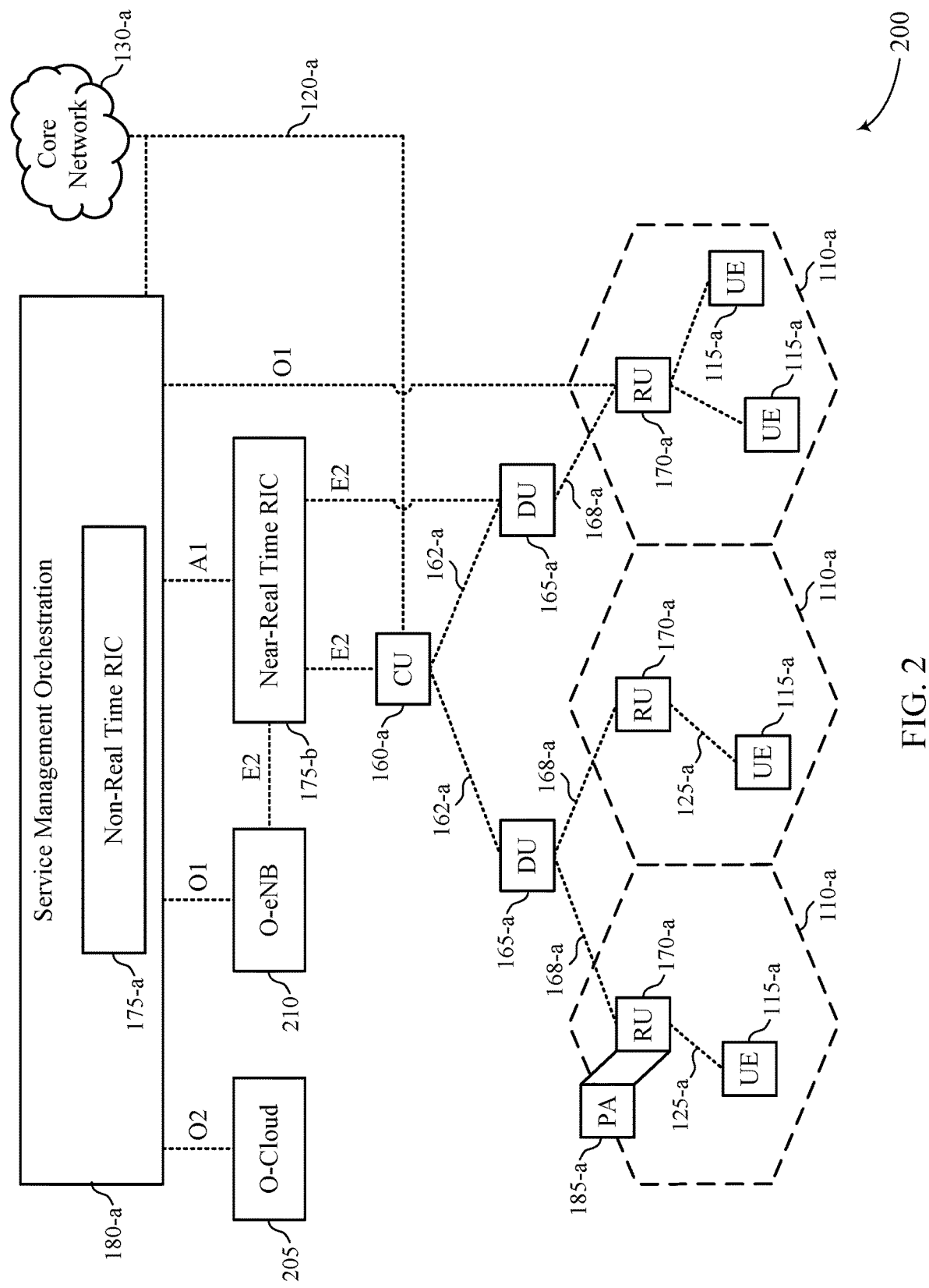
FIG. 2 shows an example of a network architecture that supports power harvesting using a multi-tone energy waveform in accordance with one or more aspects of the present disclosure.

FIG. 2 shows an example of a network architecture 200 (e.g., a disaggregated base station architecture, a disaggregated RAN architecture) that supports power harvesting using a multi-tone energy waveform in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation, and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture. In some examples, an RU 170-*a* may include a PA 185-*a* (e.g., a PA 185 as described with reference to FIG. 1). The RU 170-*a* may use the PA 185-*a* to amplify a transmit power output for one or more wireless communications signals.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via 01) or via generation of RAN management policies (e.g., A1 policies).

According to the techniques described herein, the one or more components of the core network 130-*a* may perform a closed loop multi-sine waveform operation that allocates resources for both multi-tone energy waveforms and data waveforms in accordance with the transmission capabilities of the PA. For example, a DU 165-*a* may dedicate a set of resources that span a TTI. As such, the DU 165-*a* of the network entity 105 may allocate an initial subset of resources from the set of resources to a data waveform and indicate the data waveform and the initial resource allocation to an associated RU 170-*a*. The RU 170-*a* may transmit, in response to the DU 165-*a*, a PAPR for the data waveform and a peak power value for the TTI associated with the capabilities of the PA. As such, the DU 165-*a* may use the PAPR and the peak power value of the TTI to determine a second subset of resources to allocate for the multi-tone energy waveform. The DU 165-*a* may proceed to output to the RU 170-*a* a multiplexed waveform that includes the data waveform carried on the first subset of resources and the multi-tone energy waveform carried on the second subset of resources. As such, the RU 170-*a* may transmit the multiplexed waveform to one or more wireless devices during the TTI.

Figure 3:
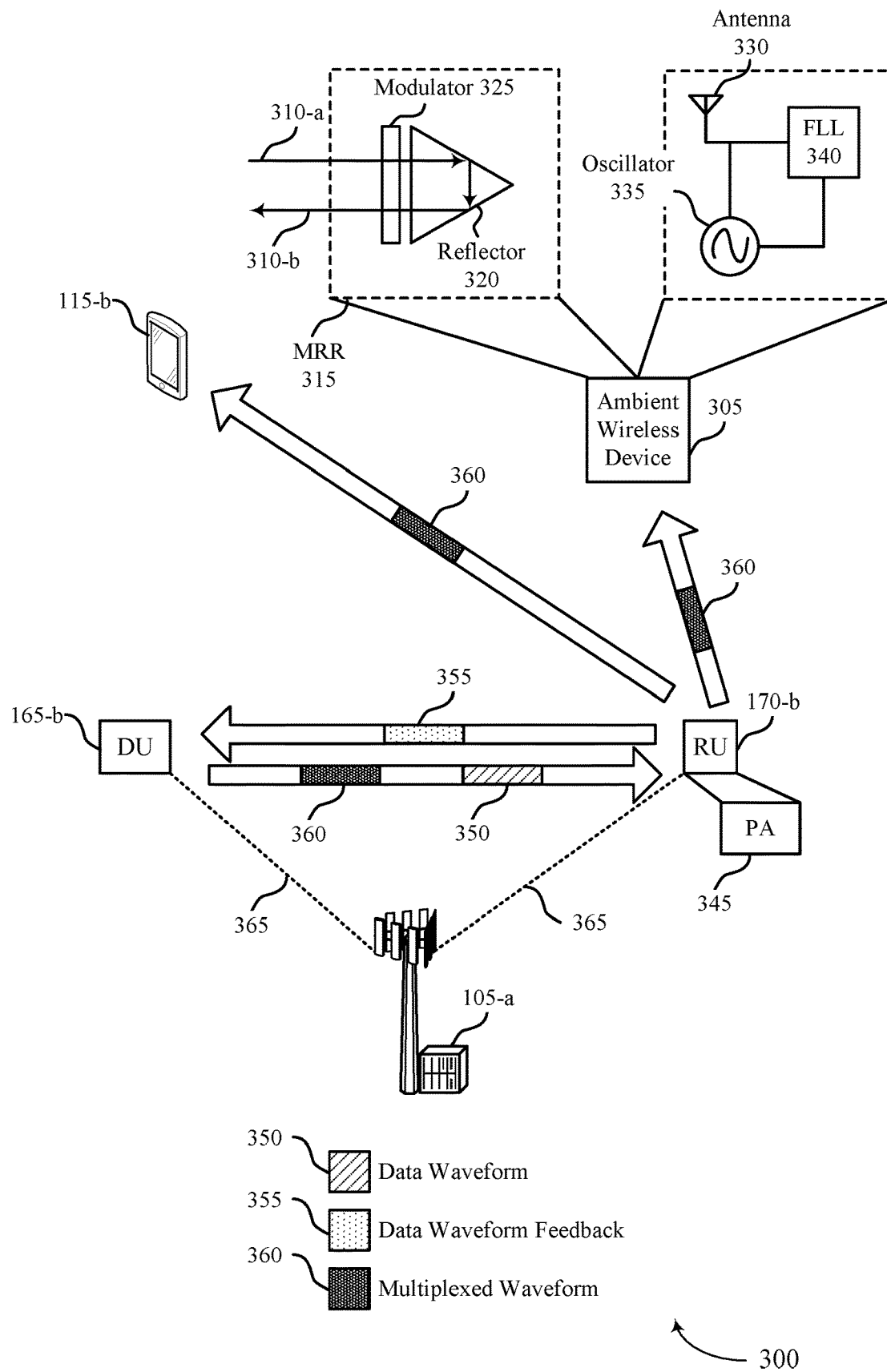
FIG. 3 shows an example of a wireless communications system that supports power harvesting using a multi-tone energy waveform in accordance with one or more aspects of the present disclosure.

FIG. 3 shows an example of a wireless communications system 300 that supports power harvesting using a multi-tone energy waveform in accordance with one or more aspects of the present disclosure. In some examples, the wireless communications system 300 may support aspects of wireless communications systems 100 and network architecture 200. For example, the wireless communications system 300 may include a network entity 105-*a* that includes a DU 165-b and an RU 170-b, which may be respective examples of a network entity 105, a DU 165, and an RU 170 as described with reference to FIGS. 1 and 2. In some examples, the RU 170-b and the DU 165-b may communicate via communication links 365 which may be examples of backhaul communication links 120, midhaul communication links 162, fronthaul communication links 168, or a combination thereof as described with reference to FIG. 2. Additionally, a UE 115-b may be an example of a UE 115 as described with reference to FIGS. 1 and 2.

In some examples, an ambient wireless device 305 may be an example of a radio frequency identification (RFID) tag which may communicate with the network entity 105-a via a continuous waveform (e.g., forward link) and a backscattered signal (e.g., backward link). As such, the ambient wireless device 305 may be one or more types of an RFID tag. Systems that support communications between the ambient wireless device 305 and the network entity 105-a may be referred to as RFID systems and may operate in ISM bands, NR licensed bands, or NR-U bands.

In some examples, the ambient wireless device 305 may be a passive ambient wireless device 305 which may be a light weight IoT ambient wireless device 305 with no battery. As such, the passive ambient wireless device 305 may capture power from a radio wave (e.g., such as the continuous waveform) and use radio frequency backscatter communications to communicate with the network entity 105-a. For example, the ambient wireless device 305 may include a modulated retro reflector (MRR) 315, which may allow the ambient wireless device 305 to reflect and modulate received optical beams 310 (e.g., at a high bandwidth). The MRR 315 may include a modulator 325 and a reflector 320. There may be many different types of modulators 325 such as deformable micro-electro-mechanical systems (MEMs), liquid crystals, electro-optic phase modulators, and multiple quantum wells (MQW). Further, there may be many different types of reflectors 320 such as corner cube or cat's eye. The ambient wireless device 305 may receive an optical beam 310 from the network entity 105-a and change the direction of the optical beam 310 using the reflector 320 (e.g., reflect the optical beam 310 in a same or similar direction in which it was received). The reflected optical beam 310 (e.g., an optical beam 310-a) may pass through the modulator 325 and the modulated optical beam 310 (e.g., the modulated optical beam 310-b) may continue in the direction dictated by the reflector 320. In such examples, the modulated optical beam 310 may be an example of a backscattered signal.

In some examples, the ambient wireless device 305 may be a semi-passive ambient wireless device 305, which may be a light weight IoT ambient wireless device 305 that uses radio frequency backscatter communications to communicate with the network entity 105-a. In some cases, the semi-passive ambient wireless device 305 may include a battery or a capacitor that may be able to store charge or energy. Additionally, or alternately, the semi-passive ambient wireless device 305 may perform energy harvesting (e.g., harvest energy from received wireless transmissions, harvest energy from wind power, harvest energy from solar power, or the like) and store the harvested energy in energy storage circuits. Additionally, or alternatively, the semi-passive ambient wireless device 305 may include a PA that may be embedded in a reception component of the ambient wireless device 305 or a transmission component of the ambient wireless device 305.

In some examples, the ambient wireless device 305 may be a semi-active ambient wireless device 305, which may be a light weight IoT ambient wireless device 305, that uses radio frequency backscatter communications to communicate with the network entity 105-a. Additionally, or alternatively, the semi-active ambient wireless device 305 may perform active communications. For example, the ambient wireless device 305 may receive wireless transmissions at an antenna 330 and transmit a response to the wireless transmissions using the antenna 330. As such, the semi-active ambient wireless device 305 may include a battery that may be rechargeable or may perform energy harvesting and store the harvested energy in energy storage circuits.

In some examples, the ambient wireless device 305 may be an active ambient wireless device 305 which may be a light weight IoT ambient wireless device 305, that uses active communications to communicate with the network entity 105-a. As such, the active ambient wireless device 305 may include a battery that may be rechargeable or may perform energy harvesting and store the harvested energy in energy storage circuits.

As illustrated in FIG. 3, the ambient wireless device 305 may include an oscillator 335 which may be used to generate transmissions (e.g., backscattering, or active transmissions) from the ambient wireless device 305 to the network entity 105-a. For instance, the oscillator 335 may be tuned, such that the transmissions are generated in a given frequency range. In some examples, the ambient wireless device 305 may include a frequency lock loop (FLL) 340. The FLL 340 may be a circuit that compares the frequency of the oscillator 335 to a reference frequency and may automatically raise or lower the frequency of the oscillator 335 until the frequency of the oscillator 335 matches that of the reference frequency. While examples of communications between the ambient wireless device 305 and the network entity 105-a are discussed, it is understood that the ambient wireless device may communicate with any quantity of devices and device types (e.g., the UE 115-b).

In some examples, the ambient wireless device 305 may receive a continuous waveform in accordance with energy harvesting techniques. For instance, a continuous waveform may be an example of an energy waveform that modulates a singular frequency tone. As such, the RU 170-b may transmit a continuous waveform to the ambient wireless device 305, in which the ambient wireless device 305 uses the energy received in the continuous waveform to perform one or more operations or store the energy (e.g., via a battery or capacitor) for later use. In some cases, however, the RU 170-b may transmit to the ambient wireless device 305 an energy waveform that spans multiple frequency tones in accordance with energy harvesting. For example, the RU 170-b may concurrently transmit a same signal over multiple frequency tones (e.g., a multi-tone energy waveform that includes multiple sinusoidal signals). In some examples, the multiple concurrent signals at varying frequency tones may cause constructive interference, increasing a peak energy of the multi-tone energy waveform in the time domain. As such, the energy carried by the multi-tone energy waveform may be greater than that of a continuous waveform, which may increase the efficacy of power harvesting at the ambient wireless device 305.

In some cases, however, the peak energy of the multi-tone energy waveform may surpass one or more transmission capabilities of the RU 170-b. For example, the RU 170-b may include a PA 345 used to amplify the power output of signals for transmission from the RU 170-b. In some examples, the PA 345 may be configured with a peak power level (e.g., a power saturation). As such, if the peak power of a multi-tone energy waveform is greater than the peak power level of the PA 345, the multi-tone energy waveform may experience clipping. In some instances, clipping may result in a distortion of the multi-tone energy waveform, in which durations of the multi-tone energy waveform with a power level greater than the peak power level of the PA 345 are reduced to the peak power level of the PA 345, which reduces the total energy of the multi-tone energy waveform. The PA 345 may be an example of a PA 185, as described with reference to FIGS. 1 and 2.

Additionally, the PA 345 may be configured with a power backoff parameter to account for PAPR associated with a data transmission. For instance, PAPR may be defined as the ratio of peak power to the average power of a signal (e.g., expressed in decibels (dB)). In some examples, the mathematical equation of PAPR may be defined as the square of peak amplitude divided by the root mean square (RMS) value. In some cases, the RU 170-$b$ may measure the PAPR for a signal in an OFDM system. As such, the power backoff parameter may reduce the power of a signal by a scaling factor to satisfy the capabilities of the PA 345. For instance, the RU 170-$b$ may use a 6-dB backoff for an OFDM 16 quadrature amplitude modulation (QAM) data transmission. That is, the value of power backoff may be based on the modulation and coding scheme (MCS) used for a data transmission.

Based on the power backoff parameter being associated with MCS, respective data transmissions using a same MCS may be at different power levels below the peak power level of the PA 345 after applying the power backoff. For instance, a first data transmission during a first TTI may be 3 dB below the peak power level of the PA 345 and a second data transmission during a second TTI may be 2 dB below the peak power level of the PA 345. As such, the efficiency of resource utilization may vary between data transmissions. In some examples, a TTI may be the duration of a symbol or one or more consecutive slots.

As such, after preparing a data waveform 350 for a TTI, the DU 165-$b$ and RU 170-$b$ may determine to allocate additional resources to a multi-tone energy waveform to better utilize resource allocation for the TTI while satisfying the peak power level of the PA 345. That is, the DU 165-$b$ and RU 170-$b$ may operate in accordance with a close loop multi-sine waveform procedure, where a quantity of tones for a multi-tone energy waveform during a TTI is based on a data transmission for the TTI.

According to the techniques described herein, the network entity 105-$a$ may allocate a set of RBs for a downlink transmission during a TTI. As such, the DU 165-$b$ may generate a data waveform 350 for the TTI corresponding to an initial resource allocation (e.g., allocating an initial subset of RBs from the set of RBs). The DU 165-$b$ may output the data waveform 350 and an indication of the initial resource allocation to the RU 170-$b$ via a fronthaul communication link 168. In some examples, the RU 170-$b$ may generate a PAPR of the data waveform 350 for the initial resource allocation. Additionally, the RU 170-$b$ may generate a peak power value of the TTI (e.g., in accordance with characteristics of the PA 345). As such, the RU 170-$b$ may transmit to the DU 165-$b$, a data waveform feedback 355 which includes information indicating the peak power value of the TTI and the PAPR of the data waveform 350 for the initial resource allocation. Based on the information included in the data waveform feedback 355, the DU 165-$b$ may determine a resource allocation for a multi-tone energy waveform and a resource allocation for the data waveform 350, such that the combination of the of the two waveforms satisfies (e.g., is equal to or below) the peak power value for the TTI.

In some examples, the RU 170-$b$ and DU 165-$b$ may perform multiple instances of the closed loop multi-sine waveform procedure to increase the resource utilization for the TTI. Further discussion of the closed loop multi-sine waveform procedure is described herein, including with reference to FIG. 4.

Based on performing one or more instances of the closed loop multi-sine waveform procedure, the DU 165-$b$ may generate a multiplexed waveform 360 that includes a first resource allocation for the data waveform 350 and a second resource allocation for the multi-tone energy waveform. As such, the DU 165-$b$ may forward (e.g., output) the multiplexed waveform 360 to the RU 170-$b$, where the RU 170-$b$ may perform power amplification of the multiplexed waveform 360 using the PA 345. Based on performing the power amplification, the RU 170-$b$ may transmit the multiplexed waveform 360 to the UE 115-$b$ and the ambient wireless device 305 for the TTI. In some examples, the multi-tone energy waveform may be dedicated for power harvesting at the ambient wireless device 305 and the data waveform 350 may be dedicated for the UE 115-$b$. Additionally, or alternatively, both the multi-tone energy waveform and the data waveform 350 may be dedicated for the ambient wireless device 305. Additionally, or alternatively, the multi-tone energy waveform may be dedicated for the ambient wireless device 305 and the data waveform 350 may be dedicated for both the UE 115-$b$ and the ambient wireless device 305. While FIG. 3 illustrates a single UE 115-$b$ and single ambient wireless device 305, it is understood that the RU 170-$b$ may transmit the multiplexed waveform 360 to any quantity of UEs 115 and any quantity of ambient wireless devices 305.

Based on the quantity of channels allocated for the ambient wireless device 305 varying across TTIs, there may be remaining RBs from the set of RBs for the TTI that are not allocated for the multi-tone energy waveform or the data waveform 350. As such, the RU 170-$b$, DU 165-$b$, or both may determine to allocate the remaining RBs for the TTI to a data transmission for the ambient wireless device 305, a data transmission for the UE 115-$b$, or both. In some examples, the network entity 105-$a$ (e.g., via the RU 170-$b$) may transmit control signaling to the UE 115-$b$ and the ambient wireless device 305 that indicates the quantity of allocated data channels for each TTI. In some examples, the network entity 105-$a$ may transmit the control singling as part of a physical downlink control channel (PDCCH) grant or an ambient wireless ambient wireless device 305 grant. In some cases, the network entity 105-$a$ may co-deploy data and control signaling for eMBB and URLLC.

Figure 4:
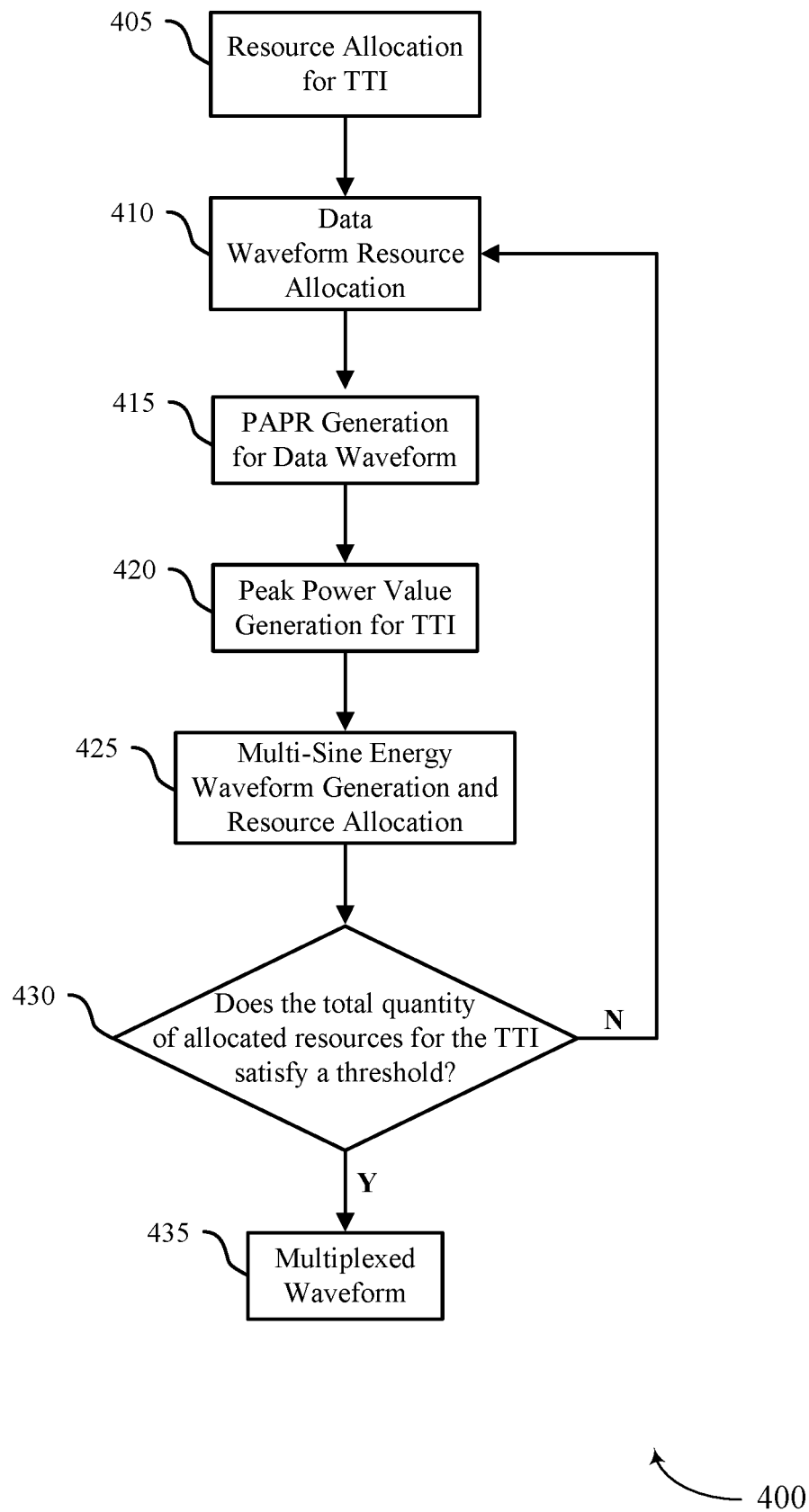
FIG. 4 shows an example of a closed loop multi-sine waveform procedure that supports power harvesting using a multi-tone energy waveform in accordance with one or more aspects of the present disclosure.

FIG. 4 shows an example of a closed loop multi-sine waveform procedure 400 that supports power harvesting using a multi-tone energy waveform in accordance with one or more aspects of the present disclosure. In some examples, the closed loop multi-sine waveform procedure 400 may support aspects of wireless communications systems 100, network architecture 200, and wireless communications system 300. For example, the closed loop multi-sine waveform procedure 400 may include one or more operations and communications between an RU 170 and a DU 165 that are included in a network entity 105, as described with reference to FIGS. 1 through 3. For instance, the closed loop multi-sine waveform procedure 400 may further detail one or more aspects of FIG. 3, including resource allocation for the data waveform 350, the generation of data waveform feedback 355, resource allocation for a multi-tone energy waveform intended for power harvesting, and the generation of the multiplexed waveform 360 that includes the data waveform 350 and the multi-tone energy waveform.

At 405, the network entity 105 may configure one or more resources for downlink transmission during a TTI. For example, the network entity 105 may allocate a set of RBs that cover a bandwidth in frequency and span the TTI in time. In some examples, each RB may span a set of sub-carrier frequencies. FIG. 4 may describe an example in which 100 RBs are allocated for the TTI, where each RB includes 12 subcarriers (e.g., 1200 total subcarriers); however, it is understood that the network entity 105 may allocate any quantity of RBs for downlink transmissions during the TTI, where each of the quantity of RBs may include any quantity of sub-carriers. Additionally, it is understood that the TTI described herein may be an example of a symbol, multiple consecutive symbols, a slot, multiple consecutive slots, a sub-slot, or multiple consecutive sub-slots. Additionally, or alternatively the set of RBs allocated for the TTI may correspond to or be associated with one or more UE channels, one or more ambient wireless device channels, or both.

At 410, the network entity 105 may perform an initial data waveform resource allocation. For example, the DU 165 may generate the data waveform 350 for transmission to one or more UEs, one or more ambient wireless devices, or both. Based on the information included in the data waveform 350, the DU 165 may determine a first quantity of RBs to allocate for the data waveform 350. In some examples, each value of the respective sub-carriers included in the first quantity of RBs is chosen in accordance with the input data of the data waveform 350 (e.g., different for each TTI, where each sub-carrier includes a complex number corresponding to a portion of the input data). In some examples, the DU 165 may choose the values of each of the sub-carriers randomly or based on a type of MCS used for the data waveform 350. In one example, the DU 165 may initially allocate 80 RBs from the set of 100 RBs for the data waveform 350. During initial resource allocation for the data waveform 350, the DU 165 may refrain from allocating RBs for ambient wireless device channels (e.g., corresponding to the multi-tone energy waveform).

As such, the DU 165 may output to the RU 170 the data waveform 350 and initial resource allocation for the data waveform 350. Additionally, or alternatively, the DU 165 may output to the RU 170 an indication of the MCS used for the data waveform 350.

At 415, the network entity 105 may generate a PAPR for the data waveform 350 corresponding to the initial resource allocation. As described with reference to FIG. 3, the PAPR may be the value of square of peak amplitude of the data waveform 350 divided by the RMS value of the data waveform 350. In some examples, prior to calculating the PAPR, the RU 170 may apply beamforming weights to one or more associated antennas (e.g., apply a beamforming vector across the one or more antennas in accordance with transmission of the data waveform 350). In such examples, the PAPR calculated for the data waveform 350 may be additionally based on the beamforming weights applied to the one or more antennas.

At 420, the network entity 105 may determine the peak power value for the TTI (e.g., the peak power the DU 165 may allocate for transmissions during the TTI). For example, after the PAPR for the data waveform 350 is calculated, the RU 170 may calculate peak power value for the TTI based on the PAPR, operating parameters of the PA of the RU 170, or both. In some examples, the operating parameters of the PA may include one or more of a power saturation value (e.g., a peak or threshold power level at which the PA may transmit wireless signals) and a power backoff value (e.g., a value indicating to reduce the power level of across the wireless signal by a scaling factor). In some examples, the power backoff value used by the RU 170 may be based on the MCS used for the data waveform 350. For instance the RU 170 may use a higher power backoff value for a 256-QAM compared to quadrature phase shift keying (QPSK). In some cases, a higher power backoff value may allow for a higher peak power for the multi-tone energy waveform. As such, the RU 170 may transmit to the DU 165 an indication of the PAPR calculated for the data waveform 350 using the initial resource allocation and an indication of the peak power value for the TTI. In examples where the RU 170 generates the PAPR after applying beamforming weights to the one or more antennas, the RU 170 may additionally transmit to the DU 165 information indicating the applied beamforming weights.

At 425, the network entity 105 may perform multi-sine energy waveform generation and resource allocation. For example, the DU 165 may use PAPR and the peak power value for the TTI to determine a quantity of RBs to allocate for the multi-sine energy waveform. In some examples, the DU 165 may use the beamforming weights applied to the one or more antennas to determine the ambient wireless device channel allocation. As the peak power value for the TTI increases, the quantity of RBs for the multi-sine energy waveform increases, which may result in an increase in energy efficiency for power harvesting. In some examples, the quantity of sub-carriers allocated to the multi-tone energy waveform and the power assigned to each of those sub-carriers may be based on a combination of the PAPR, the peak power value, and the beamforming weights. The power value assigned to each of the sub-carriers for the multi-tone energy waveform may be a constant across all of the sub-carriers or may correspond to a phase ramp.

In one example, the peak power value for the TTI may be high enough such that the DU 165 may allocate the remaining 20 RBs to the multi-sine energy waveform. However, in examples of lower peak power values for the TTI, the DU 165 may not allocate all of the remaining 20 RBs. For instance, the peak power value may allow the DU 165 to allocate 10 RBs while still satisfying (e.g., being equal to or below) the peak power value. In such an example, 80 RBs may be allocated to the data waveform 350, 10 RBs may be allocated to the multi-tone energy waveform, and 10 RBs may remain unallocated.

At 430, the network entity 105 may determine whether the total quantity of allocated resources for the TTI satisfies a threshold. The network entity 105 may dynamically configure the threshold across different TTIs or the threshold may remain constant across all TTIs. In one example, the threshold may equal the total quantity of RBs allocated for the TTI (e.g., 100 RBs). As such, in the example where the DU 165 allocated all remaining 20 RBs to the multi-tone energy waveform, the total quantity of allocated RBs may satisfy the threshold. In the example, where 10 RBs remained unallocated, the quantity of allocated RBs may not satisfy the threshold.

If the quantity of allocated RBs does not satisfy the threshold, the DU 165 and RU 170 may perform another iteration of the closed loop multi-sine waveform procedure 400. In some examples, the remaining unallocated RBs may be reallocated to the data waveform 350. That is the DU 165 may allocate the remaining 10 RBs to the data waveform 350, increasing the quantity of RBs from 80 RBs to 90 RBs. Based on the updated resource allocation for the data waveform 350, the RU 170 may compute updated parameters, including updated beamforming weights, an updated PAPR, and an updated peak power value for the TTI. Based on the updated parameters, the DU 165 may update the resource allocation for the multi-tone energy waveform to satisfy the updated peak power value for the TTI. As such, the network entity 105 may perform one or more iterations of the closed loop multi-sine waveform procedure 400 until the total quantity of allocated resources satisfies the threshold.

If the total quantity of allocated resources satisfies the threshold, then at 435 network entity 105 may generate a multiplexed waveform 360. For example, the DU 165 may generate a multiplex waveform for the TTI that includes the data waveform 350 corresponding to a first resource allocation determined via the closed loop multi-sine waveform procedure 400 and the multi-tone energy waveform corresponding to a second resource allocation determined via the closed loop multi-sine waveform procedure 400.

As such, the DU 165 may output the multiplexed waveform 360 the RU 170. The RU 170 may amplify the multiplexed waveform 360 using the associated PA and transmit the multiplexed waveform 360 to one or more wireless devices.

Figure 5:
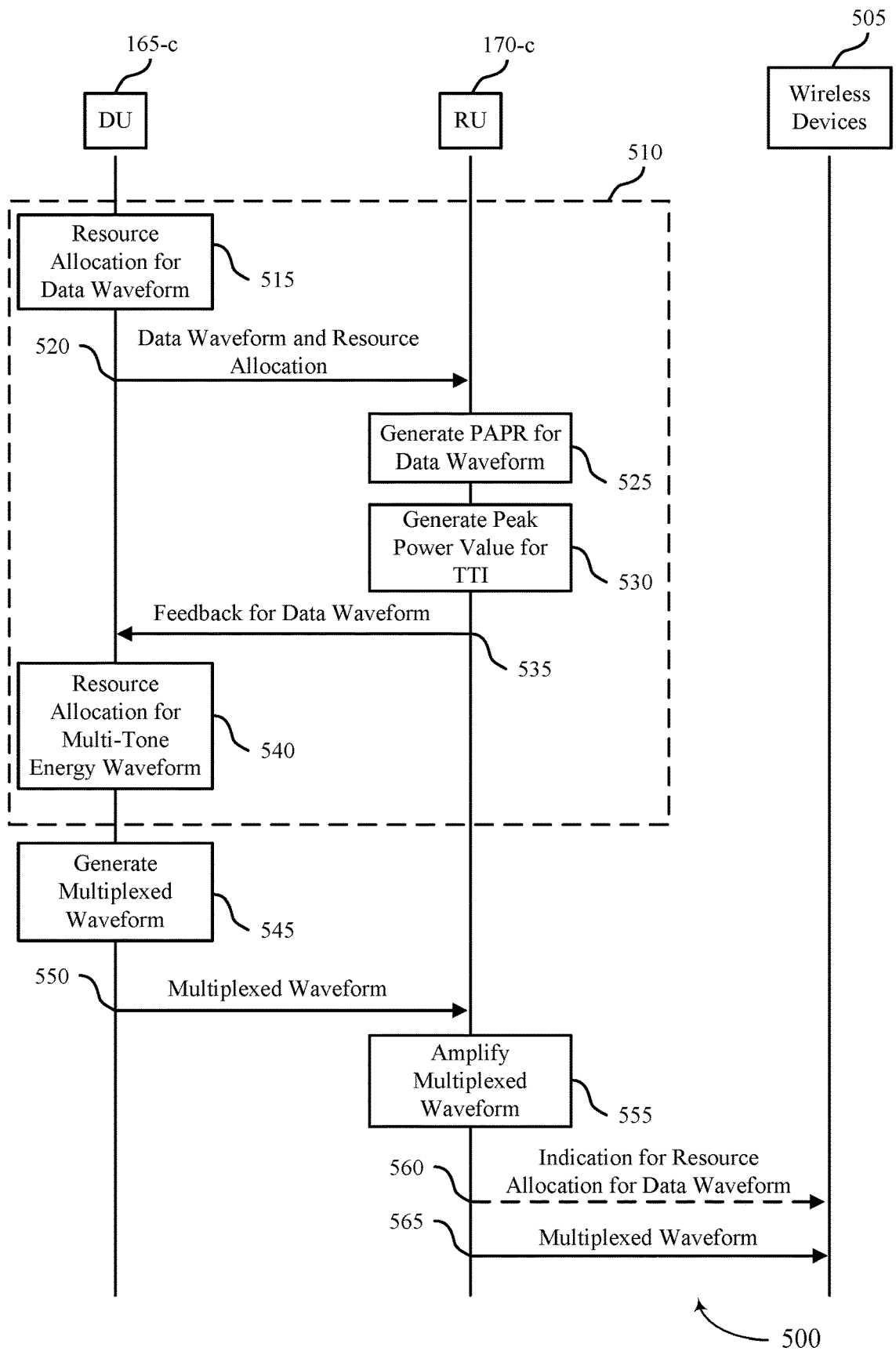
FIG. 5 shows an example of a process flow that supports power harvesting using a multi-tone energy waveform in accordance with one or more aspects of the present disclosure.

FIG. 5 shows an example of a process flow 500 that supports power harvesting using a multi-tone energy waveform in accordance with one or more aspects of the present disclosure. In some examples, process flow 500 may implement aspects of wireless communications system 100, network architecture 200, wireless communications system 300, and the closed loop multi-sine waveform procedure 400. Process flow 500 includes a DU 165-c and an RU 170-c which may be respective examples of a DU 165 and an RU 170 as described with reference to FIGS. 1 through 4. Additionally, process flow 500 includes one or more wireless device 505 which may be examples of one or more UEs 115, one or more ambient wireless devices 305, or a combination thereof. Alternative examples of the following may be implemented, where some steps are performed in a different order than described or are not performed at all. In some cases, steps may include additional features not mentioned below, or further steps may be added. In addition, while process flow 500 shows processes between an RU, a DU, and one or more wireless devices, it should be understood that these processes may occur between any quantity of network devices and network device types.

At 510, the DU 165-c and RU 170-c may operate in accordance with the closed loop multi-sine waveform procedure 400, as described with reference to FIG. 4.

At 515, the DU 165-c may generate a data waveform with an initial resource allocation. For example, the data waveform may be associated with a downlink transmission scheduled for a TTI. In some examples, the initial resource allocation may span a set of RBs within the TTI. As such, the DU 165-c may allocate a first quantity of RBs of the set of RBs as the initial resource allocation for the data waveform. In some examples, the first quantity of RBs may be based on a quantity of data for the data waveform, an MCS associated with the data waveform, or both. In some examples, the TTI may be the duration of a single symbol (e.g., scheduled for at least downlink transmissions).

At 520, the DU 165-c may output to the RU 170-c the data waveform and an indication of the initial resource allocation for the data waveform.

At 525, the RU 170-c may generate a PAPR for the data waveform and the initial resource allocation for the data waveform. Additionally, or alternatively, the RU 170-c may apply a beamforming vector associated with the data waveform to one or more antennas of the RU 170-c. In such examples, generating the PAPR for the data waveform and the initial resource allocation for the data waveform occurs after and may be based on applying the beamforming vector. Additionally, the PAPR comprises a respective value associated with each respective antenna of the one or more antennas of the RU 170-c.

At 530, the RU 170-c may generate, after generating the PAPR, a peak power value of the TTI based on a power saturation value of a PA and a power backoff value of the PA. In some examples, the DU 165-c may select the power backoff value of the PA based on an MCS associated with the data waveform.

At 535, the RU 170-c may transmit to the DU 165-c the peak power value associated with the TTI and information associated with the PAPR for the data waveform and the initial resource allocation for the data waveform.

At 540, the DU 165-c may perform a second resource allocation for a multi-tone energy waveform corresponding to the TTI. For example, the DU 165-c may allocate a second quantity of RBs of the set of RBs as the second resource allocation for the multi-tone energy waveform. In some examples, the second quantity of RBs may be based on the peak power value associated with the TTI and the information associated with the PAPR. In some examples, the multi-tone energy waveform may include multiple sinusoidal waveforms for energy harvesting for one or more passive wireless devices included in the wireless devices 505. Additionally, or alternatively, each sinusoidal waveform of the multiple sinusoidal waveforms may include a respective frequency associated with a respective resource of the second resource allocation. Additionally, or alternatively, the multi-tone energy waveform may include a respective energy waveform associated with each respective antenna of the one or more antennas of the RU 170-c.

As described with reference to FIG. 4, the RU 170-c and DU 165-c may perform multiple iterations of the closed loop multi-sine waveform procedure 400. For example, the RU 170-c and DU 165-c may refrain from performing an additional instance if a sum of the first quantity of RBs and the second quantity of RBs satisfies a threshold quantity of RBs of the set of RBs. In such examples, the initial resource allocation may be allocated as a first resource allocation associated with the data waveform.

In other examples, however, the RU 170-c and DU 165-c may determine that the sum of the first quantity of RBs and the second quantity of RBs is less than a threshold quantity of RBs of the set of RBs. In such other examples, the RU 170-c and DU 165-c may perform an additional instance of the closed loop multi-sine waveform procedure 400. For example, the DU 165-c may return to 515 and allocate both the first quantity of RBs of the initial resource allocation of the data waveform and the remaining quantity of RBs as the first resource allocation of the data waveform. As such, the DU 165-c and RU 170-c may perform actions 520 through 540 using the updated first resource allocation of the data waveform. The RU 170-c and DU 165-c may complete iterations of the closed loop multi-sine waveform procedure 400 once the total sum of RBs allocated across the data waveform and multi-sine energy waveform satisfy the threshold quantity of RBs of the set of RBs.

At 545, the DU 165-c may generate a multiplexed waveform for the TTI including the data waveform associated with the first resource allocation and a multi-tone energy waveform associated with the second resource allocation. In some examples, the first resource allocation and the second resource allocation may be based on the peak power value associated with the TTI and the information associated with the PAPR.

At 550, the DU 165-c may output (e.g., forward) the multiplexed waveform to the RU 170-c.

At 555, the RU 170-c may perform, via the PA of the RU 170-c, power amplification of the multiplexed waveform to a power value. In some examples, the power value of the multiplexed waveform satisfies the peak power value of the TTI (e.g., is equal to or below the peak power value of the TTI).

In some examples, at 560, the RU 170-c may transmit to the one or more wireless devices 505, control signaling that indicates the first resource allocation for the data waveform for the TTI. For example, the RU 170-c may transmit the control signaling via a PDCCH grant, a passive wireless device grant (e.g., an ambient IoT grant), or both. In some examples, the control signaling may indicate the respective first resource allocation for respective data waveforms associated with respective TTIs.

At 565, the RU 170-c may transmit during the TTI, the multiplexed waveform to the one or more wireless devices 505. In some examples, the multi-tone energy waveform may be energy harvesting for one or more passive wireless devices and the data waveform may be for one or more UEs, one or more passive wireless devices, or both.

Figure 6:
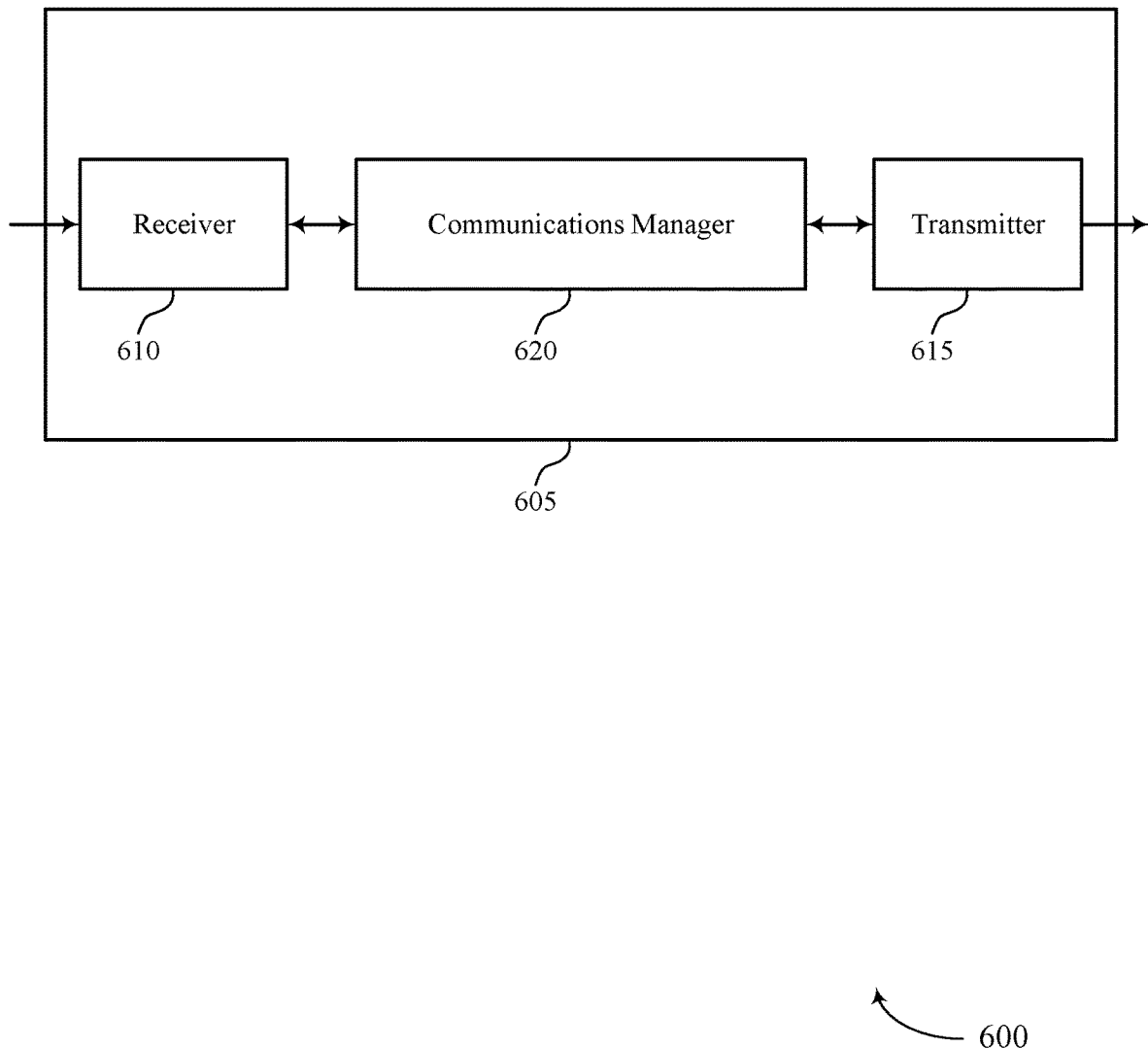
FIGS. 6 and 7 show block diagrams of devices that support power harvesting using a multi-tone energy waveform in accordance with one or more aspects of the present disclosure.

FIG. 6 shows a block diagram 600 of a device 605 that supports power harvesting using a multi-tone energy waveform in accordance with one or more aspects of the present disclosure. The device 605 may be an example of aspects of a network entity 105 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations thereof or various components thereof may be examples of means for performing various aspects of power harvesting using a multi-tone energy waveform as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for outputting, to a RU, a data waveform and an initial resource allocation for the data waveform, the initial resource allocation spanning a set of RBs within a TTI. The communications manager 620 is capable of, configured to, or operable to support a means for obtaining, from the RU, a peak power value associated with the TTI and information associated with a PAPR that is based on the data waveform and the initial resource allocation for the data waveform. The communications manager 620 is capable of, configured to, or operable to support a means for outputting, to the RU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR.

Additionally, or alternatively, the communications manager 620 may support wireless communications in accordance with examples as disclosed herein. For example, the communications manager 620 is capable of, configured to, or operable to support a means for receiving, from a DU, a data waveform and an initial resource allocation for the data waveform, the initial resource allocation spanning a set of RBs within a TTI. The communications manager 620 is capable of, configured to, or operable to support a means for transmitting, to the DU, a peak power value associated with the TTI and information associated with a PAPR that is based on the data waveform and the initial resource allocation for the data waveform. The communications manager 620 is capable of, configured to, or operable to support a means for receiving, from the DU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR. The communications manager 620 is capable of, configured to, or operable to support a means for transmitting, during the TTI, the multiplexed waveform to one or more wireless devices.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, and more efficient utilization of communication resources.

Figure 7:
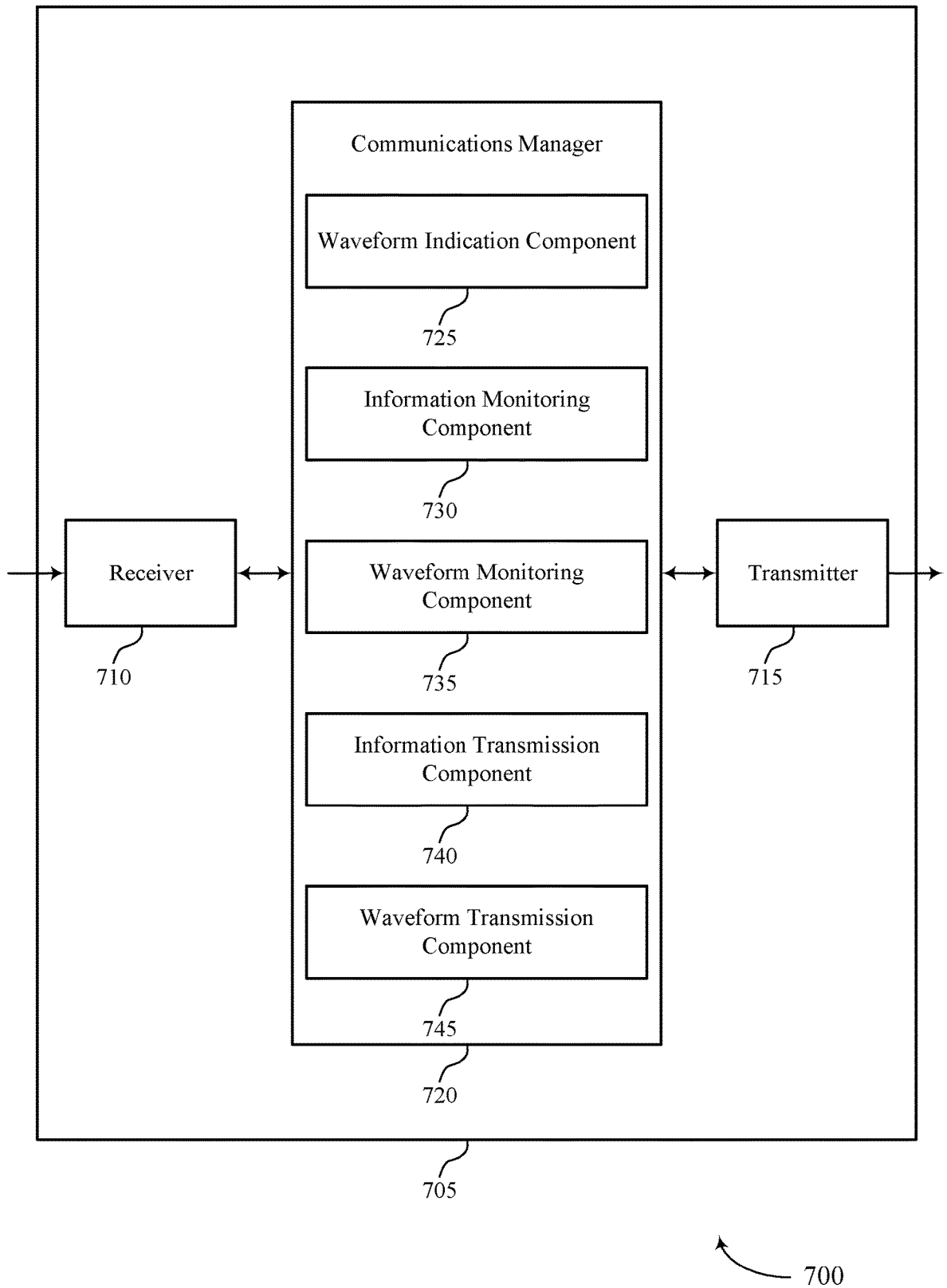

FIG. 7 shows a block diagram 700 of a device 705 that supports power harvesting using a multi-tone energy waveform in accordance with one or more aspects of the present disclosure. The device 705 may be an example of aspects of a device 605 or a network entity 105 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of power harvesting using a multi-tone energy waveform as described herein. For example, the communications manager 720 may include a waveform indication component 725, an information monitoring component 730, a waveform monitoring component 735, an information transmission component 740, a waveform transmission component 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The waveform indication component 725 is capable of, configured to, or operable to support a means for outputting, to a RU, a data waveform and an initial resource allocation for the data waveform, the initial resource allocation spanning a set of RBs within a TTI. The information monitoring component 730 is capable of, configured to, or operable to support a means for obtaining, from the RU, a peak power value associated with the TTI and information associated with a PAPR that is based on the data waveform and the initial resource allocation for the data waveform. The waveform indication component 725 is capable of, configured to, or operable to support a means for outputting, to the RU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR.

Additionally, or alternatively, the communications manager 720 may support wireless communications in accordance with examples as disclosed herein. The waveform monitoring component 735 is capable of, configured to, or operable to support a means for receiving, from a DU, a data waveform and an initial resource allocation for the data waveform, the initial resource allocation spanning a set of RBs within a TTI. The information transmission component 740 is capable of, configured to, or operable to support a means for transmitting, to the DU, a peak power value associated with the TTI and information associated with a PAPR that is based on the data waveform and the initial resource allocation for the data waveform. The waveform indication component 725 is capable of, configured to, or operable to support a means for receiving, from the DU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR. The waveform transmission component 745 is capable of, configured to, or operable to support a means for transmitting, during the TTI, the multiplexed waveform to one or more wireless devices.

Figure 8:
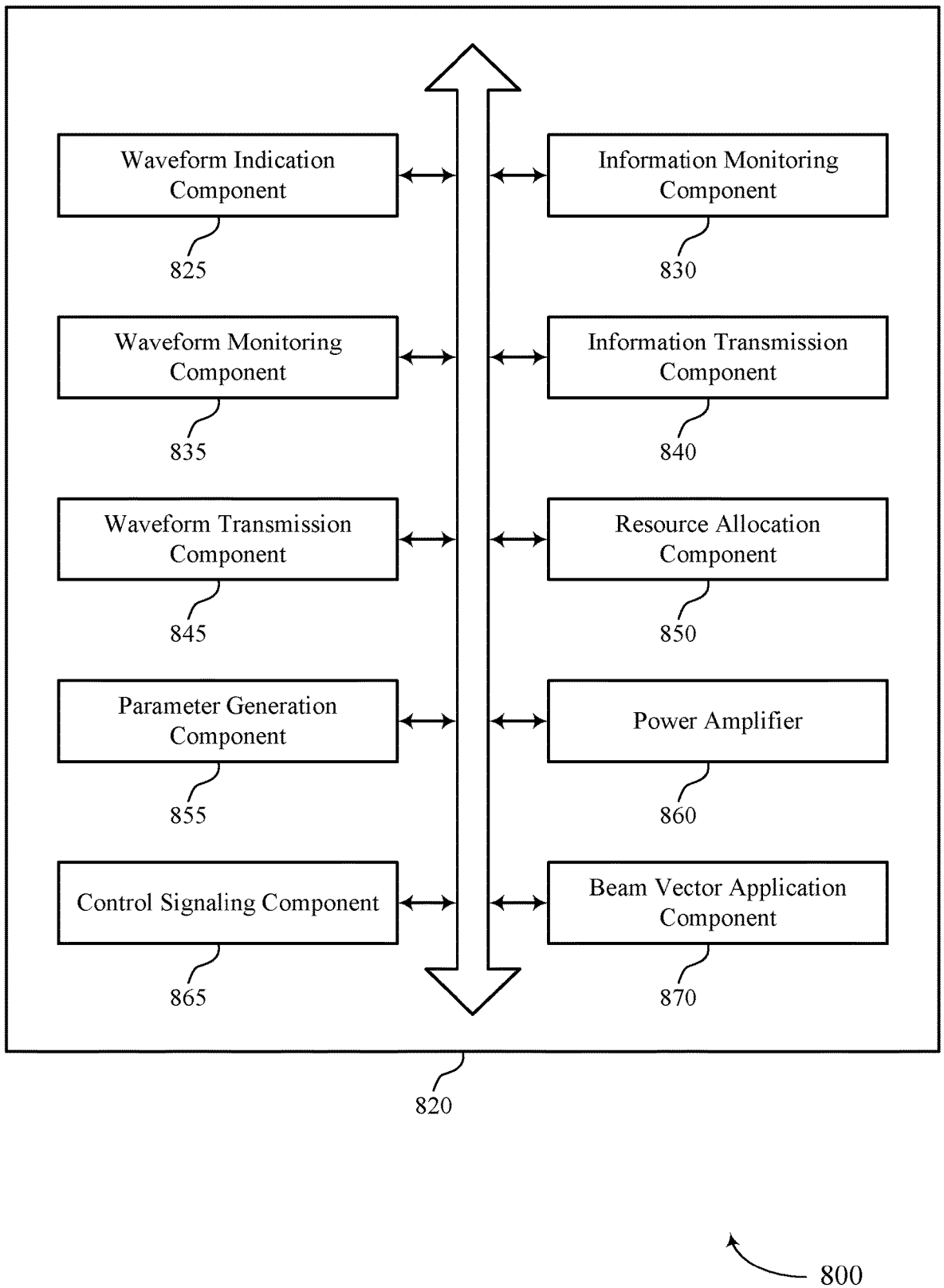
FIG. 8 shows a block diagram of a communications manager that supports power harvesting using a multi-tone energy waveform in accordance with one or more aspects of the present disclosure.

FIG. 8 shows a block diagram 800 of a communications manager 820 that supports power harvesting using a multi-tone energy waveform in accordance with one or more aspects of the present disclosure. The communications manager 820 may be an example of aspects of a communications manager 620, a communications manager 720, or both, as described herein. The communications manager 820, or various components thereof, may be an example of means for performing various aspects of power harvesting using a multi-tone energy waveform as described herein. For example, the communications manager 820 may include a waveform indication component 825, an information monitoring component 830, a waveform monitoring component 835, an information transmission component 840, a waveform transmission component 845, a resource allocation component 850, a parameter generation component 855, a PA 860, a control signaling component 865, a beam vector application component 870, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communications in accordance with examples as disclosed herein. The waveform indication component 825 is capable of, configured to, or operable to support a means for outputting, to a RU, a data waveform and an initial resource allocation for the data waveform, the initial resource allocation spanning a set of RBs within a TTI. The information monitoring component 830 is capable of, configured to, or operable to support a means for obtaining, from the RU, a peak power value associated with the TTI and information associated with a PAPR that is based on the data waveform and the initial resource allocation for the data waveform. In some examples, the waveform indication component 825 is capable of, configured to, or operable to support a means for outputting, to the RU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR.

In some examples, the resource allocation component 850 is capable of, configured to, or operable to support a means for allocating a first quantity of RBs of the set of RBs as the initial resource allocation for the data waveform, where the first quantity of RBs is based on a quantity of data for the data waveform, a MCS associated with the data waveform, or both. In some examples, the resource allocation component 850 is capable of, configured to, or operable to support a means for allocating a second quantity of RBs of the set of RBs as the second resource allocation for the multi-tone energy waveform, where the second quantity of RBs is based on the peak power value associated with the TTI and the information associated with the PAPR.

In some examples, the initial resource allocation is allocated as the first resource allocation based on a sum of the first quantity of RBs and the second quantity of RBs satisfying a threshold quantity of RBs of the set of RBs.

In some examples, a sum of the first quantity of RBs and the second quantity of RBs is less than a threshold quantity of RBs of the set of RBs, and the resource allocation component 850 is capable of, configured to, or operable to support a means for allocating both the first quantity of RBs of the initial resource allocation of the data waveform and a remaining quantity of RBs of the set of RBs as the first resource allocation of the data waveform.

In some examples, the multi-tone energy waveform is energy harvesting for a passive wireless device and the data waveform is for a UE.

In some examples, the multi-tone energy waveform includes multiple sinusoidal waveforms for energy harvesting for a passive wireless device. In some examples, each sinusoidal waveform of the multiple sinusoidal waveforms includes a respective frequency associated with a respective resource of the second resource allocation.

In some examples, the TTI is a duration of a single symbol.

Additionally, or alternatively, the communications manager 820 may support wireless communications in accordance with examples as disclosed herein. The waveform monitoring component 835 is capable of, configured to, or operable to support a means for receiving, from a DU, a data waveform and an initial resource allocation for the data waveform, the initial resource allocation spanning a set of RBs within a TTI. The information transmission component 840 is capable of, configured to, or operable to support a means for transmitting, to the DU, a peak power value associated with the TTI and information associated with a PAPR that is based on the data waveform and the initial resource allocation for the data waveform. In some examples, the waveform indication component 825 is capable of, configured to, or operable to support a means for receiving, from the DU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR. The waveform transmission component 845 is capable of, configured to, or operable to support a means for transmitting, during the TTI, the multiplexed waveform to one or more wireless devices.

In some examples, the parameter generation component 855 is capable of, configured to, or operable to support a means for generating the PAPR for the data waveform and the initial resource allocation for the data waveform. In some examples, the parameter generation component 855 is capable of, configured to, or operable to support a means for generating, after generating the PAPR, the peak power value of the TTI based on a power saturation value of a PA and a power backoff value of the PA.

In some examples, the beam vector application component 870 is capable of, configured to, or operable to support a means for applying a beamforming vector associated with the data waveform to one or more antennas of the RU, where generating the PAPR for the data waveform and the initial resource allocation for the data waveform occurs after and is based on applying the beamforming vector.

In some examples, the PAPR includes a respective value associated with each respective antenna of the one or more antennas of the RU. In some examples, the multi-tone energy waveform includes a respective energy waveform associated with each respective antenna of the one or more antennas of the RU.

In some examples, the power backoff value of the PA is based on a MCS associated with the data waveform.

In some examples, the PA 860 is capable of, configured to, or operable to support a means for performing, via a PA of the RU, power amplification of the multiplexed waveform to a power value, where the power value satisfies the peak power value of the TTI.

In some examples, the control signaling component 865 is capable of, configured to, or operable to support a means for transmitting, to the one or more wireless devices, control signaling that indicates the first resource allocation for the data waveform for the TTI.

In some examples, to support transmitting the control signaling, the control signaling component 865 is capable of, configured to, or operable to support a means for transmitting the control signaling via a PDCCH grant, an passive wireless device grant, or both.

In some examples, the multi-tone energy waveform is energy harvesting for a passive wireless device and the data waveform is for a UE.

In some examples, the multi-tone energy waveform includes multiple sinusoidal waveforms for energy harvesting for a passive wireless device. In some examples, each sinusoidal waveform of the multiple sinusoidal waveforms includes a respective frequency associated with a respective resource of the second resource allocation.

In some examples, the TTI is a duration of a single symbol.

Figure 9:
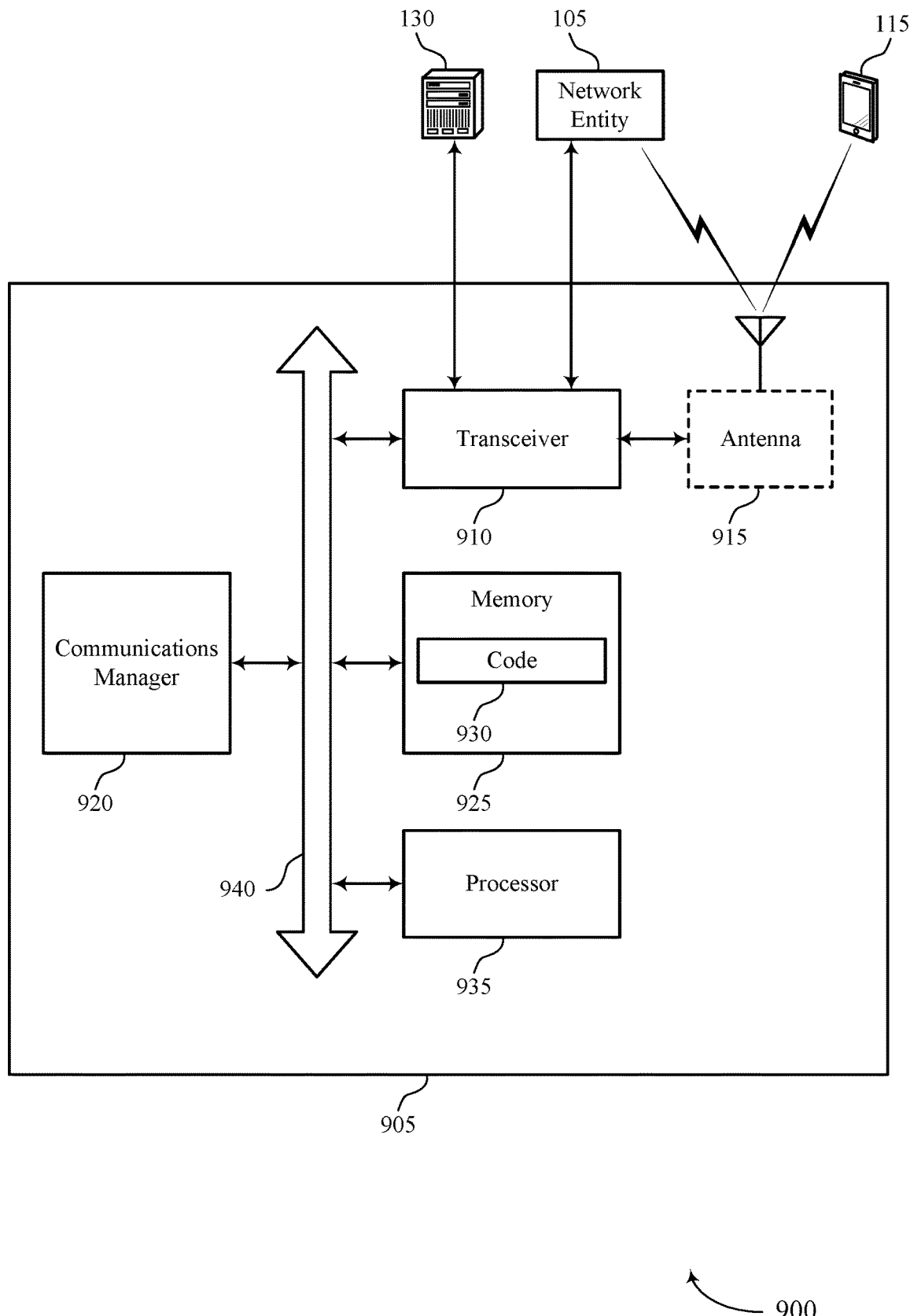
FIG. 9 shows a diagram of a system including a device that supports power harvesting using a multi-tone energy waveform in accordance with one or more aspects of the present disclosure.

FIG. 9 shows a diagram of a system 900 including a device 905 that supports power harvesting using a multi-tone energy waveform in accordance with one or more aspects of the present disclosure. The device 905 may be an example of or include the components of a device 605, a device 705, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, at least one memory 925, code 930, and at least one processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or one or more memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or one or more memory components (e.g., the at least one processor 935, the at least one memory 925, or both), may be included in a chip or chip assembly that is installed in the device 905. In some examples, the transceiver 910 may be operable to support communications via one or more communications links (e.g., a communication link 125, a backhaul communication link 120, a midhaul communication link 162, a fronthaul communication link 168).

The at least one memory 925 may include RAM, ROM, or any combination thereof. The at least one memory 925 may store computer-readable, computer-executable code 930 including instructions that, when executed by one or more of the at least one processor 935, cause the device 905 to perform various functions described herein. The code 930 may be stored in a non-transitory computer-readable medium such as system memory or another type of memory. In some cases, the code 930 may not be directly executable by a processor of the at least one processor 935 but may cause a computer (e.g., when compiled and executed) to perform functions described herein. In some cases, the at least one memory 925 may contain, among other things, a BIOS which may control basic hardware or software operation such as the interaction with peripheral components or devices. In some examples, the at least one processor 935 may include multiple processors and the at least one memory 925 may include multiple memories. One or more of the multiple processors may be coupled with one or more of the multiple memories which may, individually or collectively, be configured to perform various functions herein (for example, as part of a processing system).

The at least one processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 935 may be configured to operate a memory array using a memory controller. In some other cases, a memory controller may be integrated into one or more of the at least one processor 935. The at least one processor 935 may be configured to execute computer-readable instructions stored in a memory (e.g., one or more of the at least one memory 925) to cause the device 905 to perform various functions (e.g., functions or tasks supporting power harvesting using a multi-tone energy waveform). For example, the device 905 or a component of the device 905 may include at least one processor 935 and at least one memory 925 coupled with one or more of the at least one processor 935, the at least one processor 935 and the at least one memory 925 configured to perform various functions described herein. The at least one processor 935 may be an example of a cloud-computing platform (e.g., one or more physical nodes and supporting software such as operating systems, virtual machines, or container instances) that may host the functions (e.g., by executing code 930) to perform the functions of the device 905. The at least one processor 935 may be any one or more suitable processors capable of executing scripts or instructions of one or more software programs stored in the device 905 (such as within one or more of the at least one memory 925). In some implementations, the at least one processor 935 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or sub-components of the device 905, such as the at least one processor 935, or the transceiver 910, or the communications manager 920, or other components or combinations of components of the device 905. The processing system of the device 905 may interface with other components of the device 905, and may process information received from other components (such as inputs or signals) or output information to other components. For example, a chip or modem of the device 905 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 905 may transmit information output from the chip or modem. Additionally, or alternatively, in some implementations, the one or more interfaces may refer to an interface between the processing system of the chip or modem and a receiver, such that the device 905 may obtain information or signal inputs, and the information may be passed to the processing system. A person having ordinary skill in the art will readily recognize that a first interface also may obtain information or signal inputs, and a second interface also may output information or signal outputs.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the at least one memory 925, the code 930, and the at least one processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communications in accordance with examples as disclosed herein. For example, the communications manager 920 is capable of, configured to, or operable to support a means for outputting, to a RU, a data waveform and an initial resource allocation for the data waveform, the initial resource allocation spanning a set of RBs within a TTI. The communications manager 920 is capable of, configured to, or operable to support a means for obtaining, from the RU, a peak power value associated with the TTI and information associated with a PAPR that is based on the data waveform and the initial resource allocation for the data waveform. The communications manager 920 is capable of, configured to, or operable to support a means for outputting, to the RU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR.

Additionally, or alternatively, the communications manager 920 may support wireless communications in accordance with examples as disclosed herein. For example, the communications manager 920 is capable of, configured to, or operable to support a means for receiving, from a DU, a data waveform and an initial resource allocation for the data waveform, the initial resource allocation spanning a set of RBs within a TTI. The communications manager 920 is capable of, configured to, or operable to support a means for transmitting, to the DU, a peak power value associated with the TTI and information associated with a PAPR that is based on the data waveform and the initial resource allocation for the data waveform. The communications manager 920 is capable of, configured to, or operable to support a means for receiving, from the DU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR. The communications manager 920 is capable of, configured to, or operable to support a means for transmitting, during the TTI, the multiplexed waveform to one or more wireless devices.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, one or more of the at least one processor 935, one or more of the at least one memory 925, the code 930, or any combination thereof (for example, by a processing system including at least a portion of the at least one processor 935, the at least one memory 925, the code 930, or any combination thereof). For example, the code 930 may include instructions executable by one or more of the at least one processor 935 to cause the device 905 to perform various aspects of power harvesting using a multi-tone energy waveform as described herein, or the at least one processor 935 and the at least one memory 925 may be otherwise configured to, individually or collectively, perform or support such operations.

Figure 10:
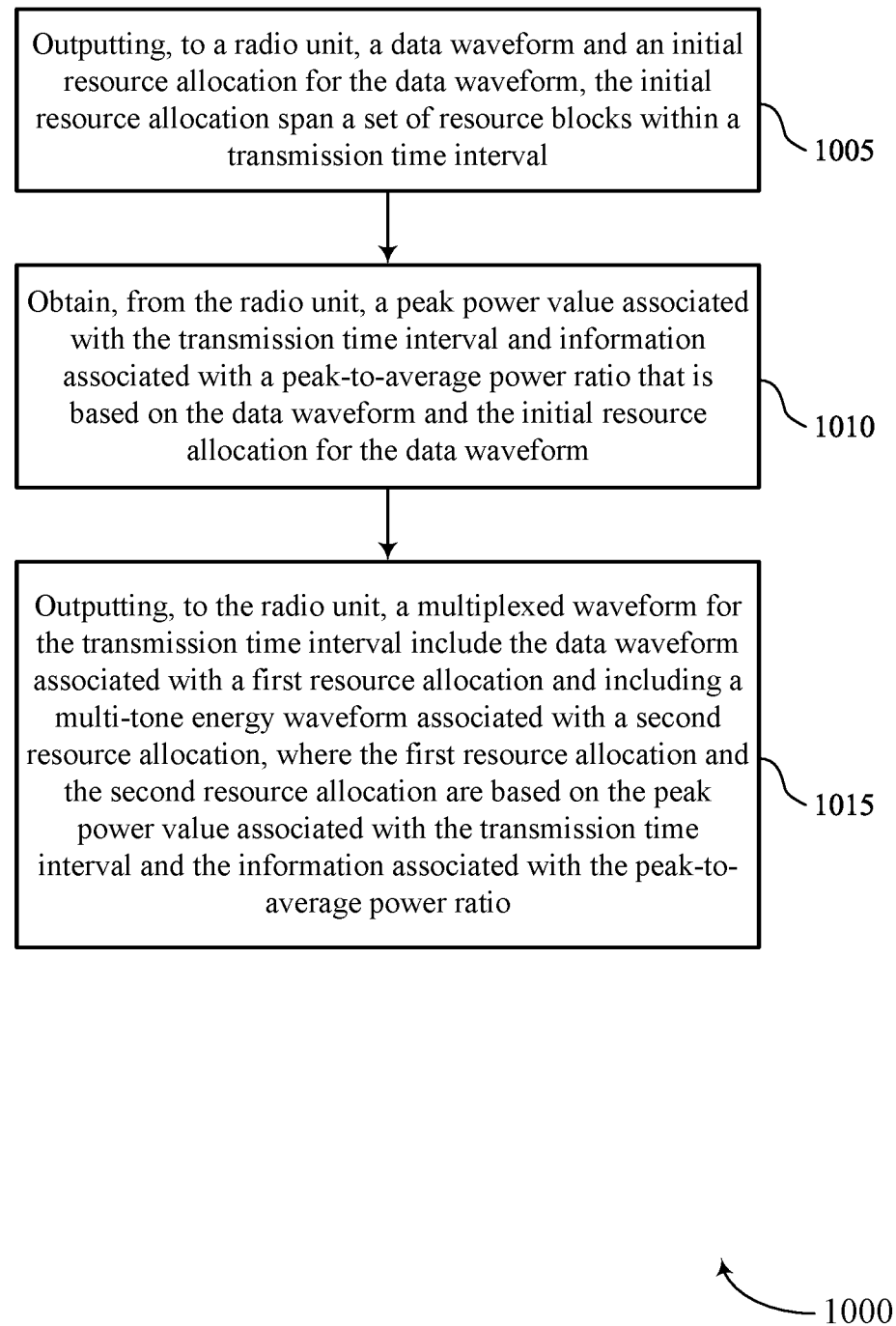
FIGS. 10 through 13 show flowcharts illustrating methods that support power harvesting using a multi-tone energy waveform in accordance with one or more aspects of the present disclosure.

FIG. 10 shows a flowchart illustrating a method 1000 that supports power harvesting using a multi-tone energy waveform in accordance with aspects of the present disclosure. The operations of the method 1000 may be implemented by a network entity or its components as described herein. For example, the operations of the method 1000 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1005, the method may include outputting, to a RU, a data waveform and an initial resource allocation for the data waveform, the initial resource allocation spanning a set of RBs within a TTI. The operations of block 1005 may be performed in accordance with examples as disclosed herein. In some examples, aspects of the operations of 1005 may be performed by a waveform indication component 825 as described with reference to FIG. 8.

At 1010, the method may include obtaining, from the RU, a peak power value associated with the TTI and information associated with a PAPR that is based on the data waveform and the initial resource allocation for the data waveform. The operations of block 1010 may be performed in accordance with examples as disclosed herein. In some examples, aspects of the operations of 1010 may be performed by an information monitoring component 830 as described with reference to FIG. 8.

At 1015, the method may include outputting, to the RU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR. The operations of block 1015 may be performed in accordance with examples as disclosed herein. In some examples, aspects of the operations of 1015 may be performed by a waveform indication component 825 as described with reference to FIG. 8.

Figure 11:
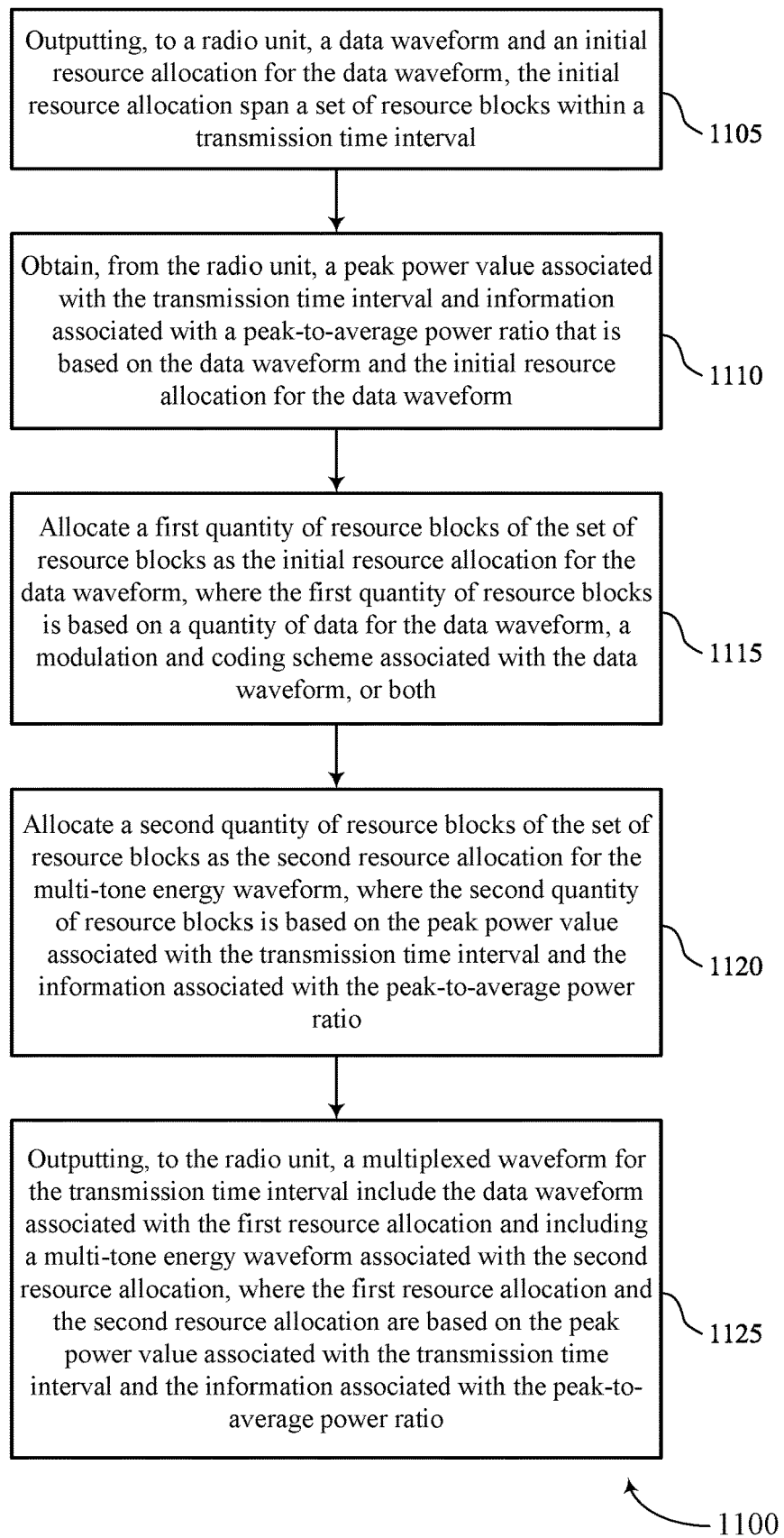

FIG. 11 shows a flowchart illustrating a method 1100 that supports power harvesting using a multi-tone energy waveform in accordance with aspects of the present disclosure. The operations of the method 1100 may be implemented by a network entity or its components as described herein. For example, the operations of the method 1100 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1105, the method may include outputting, to a RU, a data waveform and an initial resource allocation for the data waveform, the initial resource allocation spanning a set of RBs within a TTI. The operations of block 1105 may be performed in accordance with examples as disclosed herein. In some examples, aspects of the operations of 1105 may be performed by a waveform indication component 825 as described with reference to FIG. 8.

At 1110, the method may include obtaining, from the RU, a peak power value associated with the TTI and information associated with a PAPR that is based on the data waveform and the initial resource allocation for the data waveform. The operations of block 1110 may be performed in accordance with examples as disclosed herein. In some examples, aspects of the operations of 1110 may be performed by an information monitoring component 830 as described with reference to FIG. 8.

At 1115, the method may include allocating a first quantity of RBs of the set of RBs as the initial resource allocation for the data waveform, where the first quantity of RBs is based on a quantity of data for the data waveform, a MCS associated with the data waveform, or both. The operations of block 1115 may be performed in accordance with examples as disclosed herein. In some examples, aspects of the operations of 1115 may be performed by a resource allocation component 850 as described with reference to FIG. 8.

At 1120, the method may include allocating a second quantity of RBs of the set of RBs as the second resource allocation for the multi-tone energy waveform, where the second quantity of RBs is based on the peak power value associated with the TTI and the information associated with the PAPR. The operations of block 1120 may be performed in accordance with examples as disclosed herein. In some examples, aspects of the operations of 1120 may be performed by a resource allocation component 850 as described with reference to FIG. 8.

At 1125, the method may include outputting, to the RU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR. The operations of block 1125 may be performed in accordance with examples as disclosed herein. In some examples, aspects of the operations of 1125 may be performed by a waveform indication component 825 as described with reference to FIG. 8.

Figure 12:
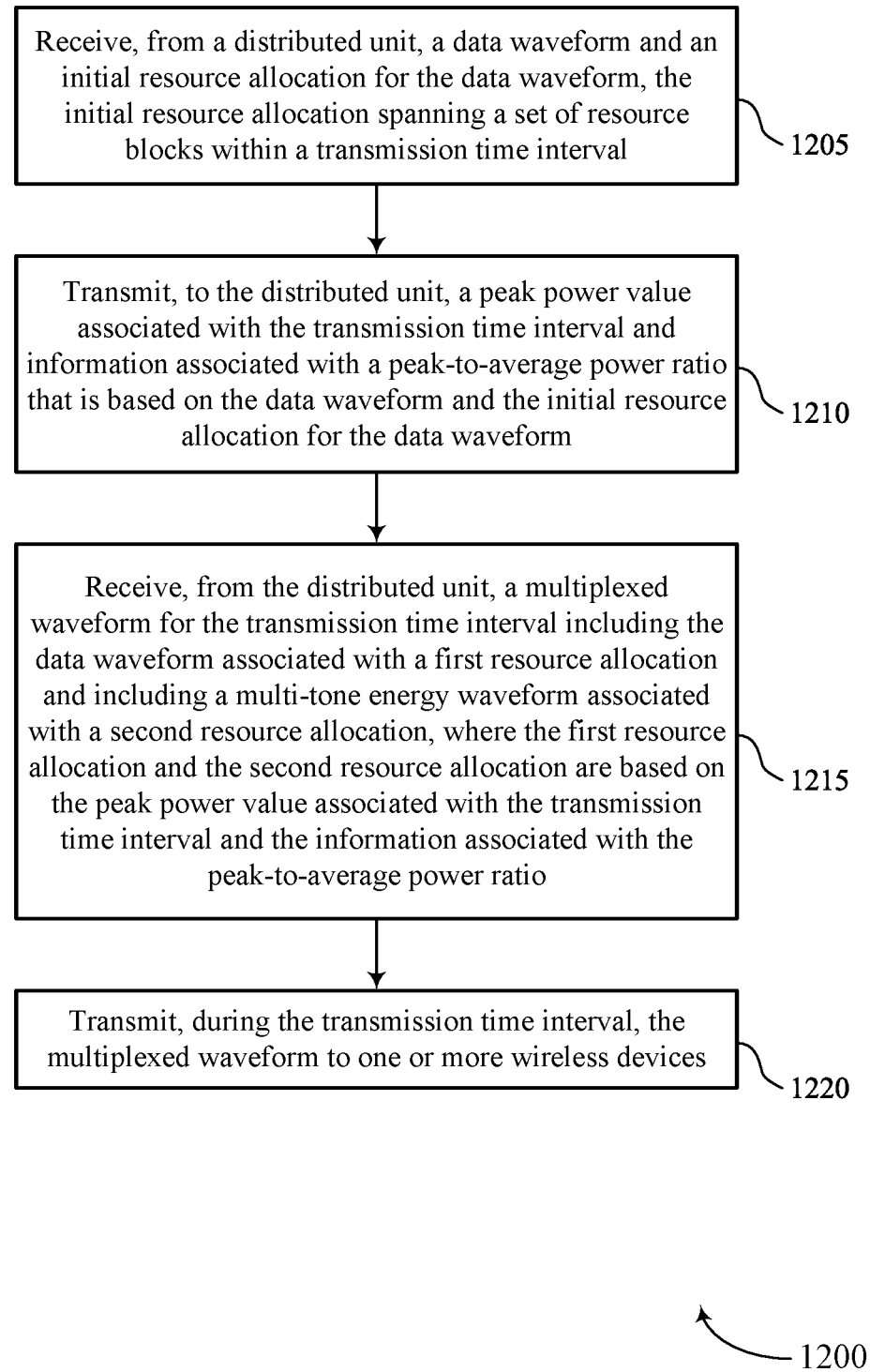

FIG. 12 shows a flowchart illustrating a method 1200 that supports power harvesting using a multi-tone energy waveform in accordance with aspects of the present disclosure. The operations of the method 1200 may be implemented by a network entity or its components as described herein. For example, the operations of the method 1200 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1205, the method may include receiving, from a DU, a data waveform and an initial resource allocation for the data waveform, the initial resource allocation spanning a set of RBs within a TTI. The operations of block 1205 may be performed in accordance with examples as disclosed herein. In some examples, aspects of the operations of 1205 may be performed by a waveform monitoring component 835 as described with reference to FIG. 8.

At 1210, the method may include transmitting, to the DU, a peak power value associated with the TTI and information associated with a PAPR that is based on the data waveform and the initial resource allocation for the data waveform. The operations of block 1210 may be performed in accordance with examples as disclosed herein. In some examples, aspects of the operations of 1210 may be performed by an information transmission component 840 as described with reference to FIG. 8.

At 1215, the method may include receiving, from the DU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR. The operations of block 1215 may be performed in accordance with examples as disclosed herein. In some examples, aspects of the operations of 1215 may be performed by a waveform indication component 825 as described with reference to FIG. 8.

At 1220, the method may include transmitting, during the TTI, the multiplexed waveform to one or more wireless devices. The operations of block 1220 may be performed in accordance with examples as disclosed herein. In some examples, aspects of the operations of 1220 may be performed by a waveform transmission component 845 as described with reference to FIG. 8.

Figure 13:
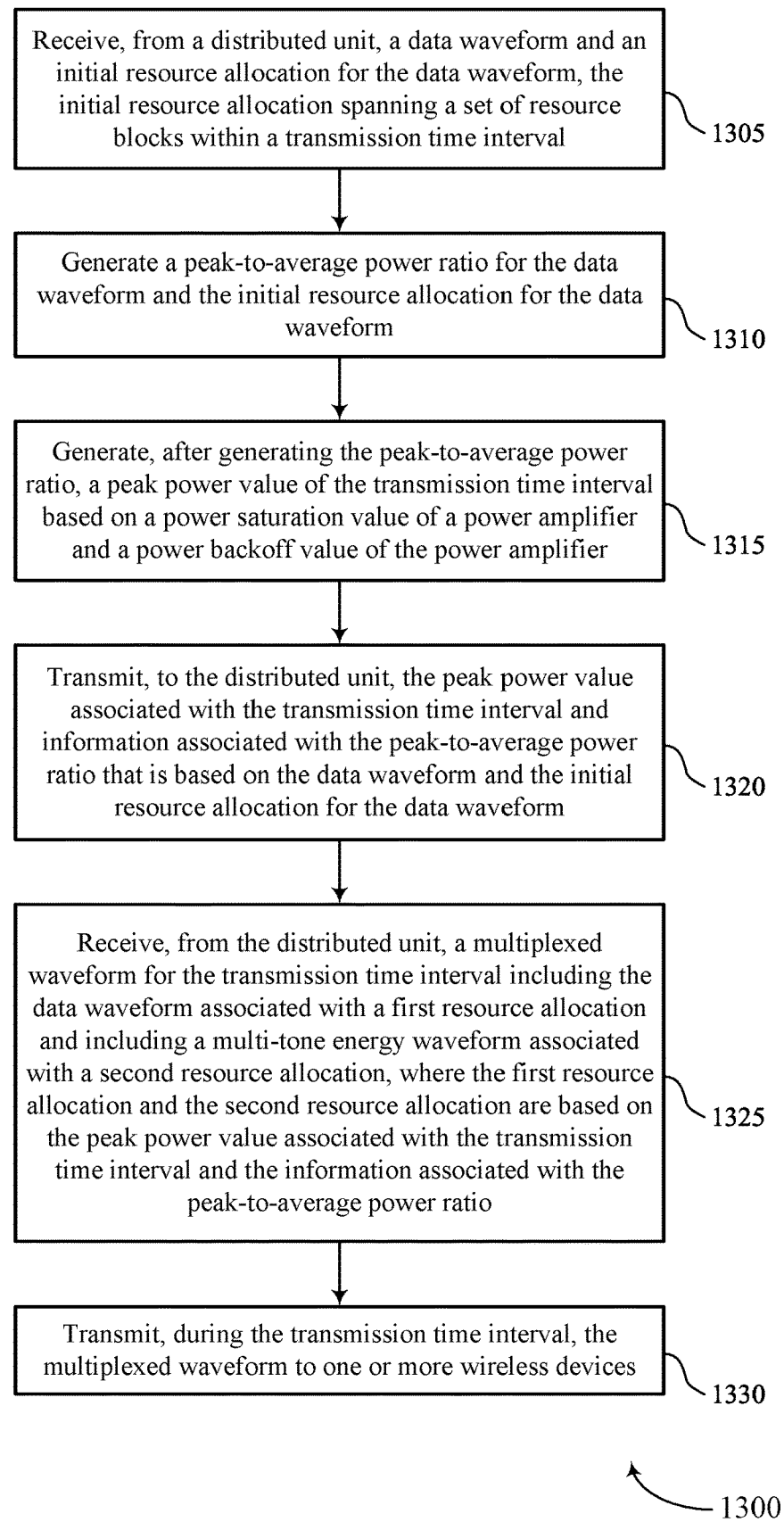

FIG. 13 shows a flowchart illustrating a method 1300 that supports power harvesting using a multi-tone energy waveform in accordance with aspects of the present disclosure. The operations of the method 1300 may be implemented by a network entity or its components as described herein. For example, the operations of the method 1300 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1305, the method may include receiving, from a DU, a data waveform and an initial resource allocation for the data waveform, the initial resource allocation spanning a set of RBs within a TTI. The operations of block 1305 may be performed in accordance with examples as disclosed herein. In some examples, aspects of the operations of 1305 may be performed by a waveform monitoring component 835 as described with reference to FIG. 8.

At 1310, the method may include generating the PAPR for the data waveform and the initial resource allocation for the data waveform. The operations of block 1310 may be performed in accordance with examples as disclosed herein. In some examples, aspects of the operations of 1310 may be performed by a parameter generation component 855 as described with reference to FIG. 8.

At 1315, the method may include generating, after generating the PAPR, the peak power value of the TTI based on a power saturation value of a PA and a power backoff value of the PA. The operations of block 1315 may be performed in accordance with examples as disclosed herein. In some examples, aspects of the operations of 1315 may be performed by a parameter generation component 855 as described with reference to FIG. 8.

At 1320, the method may include transmitting, to the DU, a peak power value associated with the TTI and information associated with a PAPR that is based on the data waveform and the initial resource allocation for the data waveform. The operations of block 1320 may be performed in accordance with examples as disclosed herein. In some examples, aspects of the operations of 1320 may be performed by an information transmission component 840 as described with reference to FIG. 8.

At 1325, the method may include receiving, from the DU, a multiplexed waveform for the TTI including the data waveform associated with a first resource allocation and including a multi-tone energy waveform associated with a second resource allocation, where the first resource allocation and the second resource allocation are based on the peak power value associated with the TTI and the information associated with the PAPR. The operations of block 1325 may be performed in accordance with examples as disclosed herein. In some examples, aspects of the operations of 1325 may be performed by a waveform indication component 825 as described with reference to FIG. 8.

At 1330, the method may include transmitting, during the TTI, the multiplexed waveform to one or more wireless devices. The operations of block 1330 may be performed in accordance with examples as disclosed herein. In some examples, aspects of the operations of 1330 may be performed by a waveform transmission component 845 as described with reference to FIG. 8.

The following provides an overview of aspects of the present disclosure:

Aspect 1: A method for wireless communications, at a DU, comprising: outputting, to a RU, a data waveform and an initial resource allocation for the data waveform, the initial resource allocation spanning a set of RBs within a TTI; obtaining, from the RU, a peak power value associated with the TTI and information associated with a PAPR that is based at least in part on the data waveform and the initial resource allocation for the data waveform; and outputting, to the RU, a multiplexed waveform for the TTI comprising the data waveform associated with a first resource allocation and comprising a multi-tone energy waveform associated with a second resource allocation, wherein the first resource allocation and the second resource allocation are based at least in part on the peak power value associated with the TTI and the information associated with the PAPR.

Aspect 2: The method of aspect 1, further comprising: allocating a first quantity of RBs of the set of RBs as the initial resource allocation for the data waveform, wherein the first quantity of RBs is based at least in part on a quantity of data for the data waveform, a MCS associated with the data waveform, or both; and allocating a second quantity of RBs of the set of RBs as the second resource allocation for the multi-tone energy waveform, wherein the second quantity of RBs is based at least in part on the peak power value associated with the TTI and the information associated with the PAPR.

Aspect 3: The method of aspect 2, wherein the initial resource allocation is allocated as the first resource allocation based at least in part on a sum of the first quantity of RBs and the second quantity of RBs satisfying a threshold quantity of RBs of the set of RBs.

Aspect 4: The method of any of aspects 2 through 3, wherein a sum of the first quantity of RBs and the second quantity of RBs is less than a threshold quantity of RBs of the set of RBs, the method further comprising: allocating both the first quantity of RBs of the initial resource allocation of the data waveform and a remaining quantity of RBs of the set of RBs as the first resource allocation of the data waveform.

Aspect 5: The method of any of aspects 1 through 4, wherein the multi-tone energy waveform is energy harvesting for a passive wireless device and the data waveform is for a UE.

Aspect 6: The method of any of aspects 1 through 5, wherein the multi-tone energy waveform comprises multiple sinusoidal waveforms for energy harvesting for a passive wireless device, and each sinusoidal waveform of the multiple sinusoidal waveforms comprises a respective frequency associated with a respective resource of the second resource allocation.

Aspect 7: The method of any of aspects 1 through 6, wherein the TTI is a duration of a single symbol.

Aspect 8: A method for wireless communications, at a RU, comprising: receiving, from a DU, a data waveform and an initial resource allocation for the data waveform, the initial resource allocation spanning a set of RBs within a TTI; transmitting, to the DU, a peak power value associated with the TTI and information associated with a PAPR that is based at least in part on the data waveform and the initial resource allocation for the data waveform; receiving, from the DU, a multiplexed waveform for the TTI comprising the data waveform associated with a first resource allocation and comprising a multi-tone energy waveform associated with a second resource allocation, wherein the first resource allocation and the second resource allocation are based at least in part on the peak power value associated with the TTI and the information associated with the PAPR; and transmitting, during the TTI, the multiplexed waveform to one or more wireless devices.

Aspect 9: The method of aspect 8, further comprising: generating the PAPR for the data waveform and the initial resource allocation for the data waveform; and generating, after generating the PAPR, the peak power value of the TTI based at least in part on a power saturation value of a PA and a power backoff value of the PA.

Aspect 10: The method of aspect 9, further comprising: applying a beamforming vector associated with the data waveform to one or more antennas of the RU, wherein generating the PAPR for the data waveform and the initial resource allocation for the data waveform occurs after and is based at least in part on applying the beamforming vector.

Aspect 11: The method of aspect 10, wherein the PAPR comprises a respective value associated with each respective antenna of the one or more antennas of the RU, and the multi-tone energy waveform comprises a respective energy waveform associated with each respective antenna of the one or more antennas of the RU.

Aspect 12: The method of any of aspects 9 through 11, wherein the power backoff value of the PA is based at least in part on a MCS associated with the data waveform.

Aspect 13: The method of any of aspects 8 through 12, further comprising: performing, via a PA of the RU, power amplification of the multiplexed waveform to a power value, wherein the power value satisfies the peak power value of the TTI.

Aspect 14: The method of any of aspects 8 through 13, further comprising: transmitting, to the one or more wireless devices, control signaling that indicates the first resource allocation for the data waveform for the TTI.

Aspect 15: The method of aspect 14, wherein transmitting the control signaling comprises: transmitting the control signaling via a PDCCH grant, an passive wireless device grant, or both.

Aspect 16: The method of any of aspects 8 through 15, wherein the multi-tone energy waveform is energy harvesting for a passive wireless device and the data waveform is for a UE.

Aspect 17: The method of any of aspects 8 through 16, wherein the multi-tone energy waveform comprises multiple sinusoidal waveforms for energy harvesting for a passive wireless device, and each sinusoidal waveform of the multiple sinusoidal waveforms comprises a respective frequency associated with a respective resource of the second resource allocation.

Aspect 18: The method of any of aspects 8 through 17, wherein the TTI is a duration of a single symbol.

Aspect 19: A DU for wireless communications, comprising one or more memories storing processor-executable code; and one or more processors coupled with the one or more memories and individually or collectively operable to execute the code to cause the DU to perform a method of any of aspects 1 through 7.

Aspect 20: A DU for wireless communications, comprising at least one means for performing a method of any of aspects 1 through 7.

Aspect 21: A non-transitory computer-readable medium storing code for wireless communications, the code comprising instructions executable by a processor to perform a method of any of aspects 1 through 7.

Aspect 22: An RU for wireless communications, comprising one or more memories storing processor-executable code; and one or more processors coupled with the one or more memories and individually or collectively operable to execute the code to cause the RU to perform a method of any of aspects 8 through 18.

Aspect 23: An RU for wireless communications, comprising at least one means for performing a method of any of aspects 8 through 18.

Aspect 24: A non-transitory computer-readable medium storing code for wireless communications, the code comprising instructions executable by a processor to perform a method of any of aspects 8 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A distributed unit for wireless communication, comprising:
   one or more memories storing processor-executable code; and
   one or more processors coupled with the one or more memories and individually or collectively operable to execute the code to cause the distributed unit to:
      output, to a radio unit, a data waveform and an initial resource allocation for the data waveform, the initial resource allocation spanning a set of resource blocks within a transmission time interval;
      obtain, from the radio unit, a peak power value associated with the transmission time interval and information associated with a peak-to-average power ratio that is based at least in part on the data waveform and the initial resource allocation for the data waveform; and
      output, to the radio unit, a multiplexed waveform for the transmission time interval comprise the data waveform associated with a first resource allocation and comprising a multi-tone energy waveform associated with a second resource allocation, wherein the first resource allocation and the second resource allocation are based at least in part on the peak power value associated with the transmission time interval and the information associated with the peak-to-average power ratio.

2. The distributed unit of claim 1, wherein the one or more processors are individually or collectively further operable to execute the code to cause the distributed unit to:
   allocate a first quantity of resource blocks of the set of resource blocks as the initial resource allocation for the data waveform, wherein the first quantity of resource blocks is based at least in part on a quantity of data for the data waveform, a modulation and coding scheme associated with the data waveform, or both; and
   allocate a second quantity of resource blocks of the set of resource blocks as the second resource allocation for the multi-tone energy waveform, wherein the second quantity of resource blocks is based at least in part on the peak power value associated with the transmission time interval and the information associated with the peak-to-average power ratio.

3. The distributed unit of claim 2, wherein the initial resource allocation is allocated as the first resource allocation based at least in part on a sum of the first quantity of resource blocks and the second quantity of resource blocks satisfying a threshold quantity of resource blocks of the set of resource blocks.

4. The distributed unit of claim 2, wherein a sum of the first quantity of resource blocks and the second quantity of resource blocks is less than a threshold quantity of resource blocks of the set of resource blocks, and the one or more processors are individually or collectively operable to execute the code to cause the distributed unit to:
   allocate both the first quantity of resource blocks of the initial resource allocation of the data waveform and a remaining quantity of resource blocks of the set of resource blocks as the first resource allocation of the data waveform.

5. The distributed unit of claim 1, wherein the multi-tone energy waveform is energy harvesting for a passive wireless device and the data waveform is for a user equipment (UE).

6. The distributed unit of claim 1, wherein:
   the multi-tone energy waveform comprises multiple sinusoidal waveforms for energy harvesting for a passive wireless device, and
   each sinusoidal waveform of the multiple sinusoidal waveforms comprises a respective frequency associated with a respective resource of the second resource allocation.

7. The distributed unit of claim 1, wherein the transmission time interval is a duration of a single symbol.

8. A radio unit for wireless communication, comprising:
   one or more memories storing processor-executable code; and
   one or more processors coupled with the one or more memories and individually or collectively operable to execute the code to cause the radio unit to:
      receive, from a distributed unit, a data waveform and an initial resource allocation for the data waveform, the initial resource allocation spanning a set of resource blocks within a transmission time interval;
      transmit, to the distributed unit, a peak power value associated with the transmission time interval and information associated with a peak-to-average power ratio that is based at least in part on the data waveform and the initial resource allocation for the data waveform;
      receive, from the distributed unit, a multiplexed waveform for the transmission time interval comprising the data waveform associated with a first resource allocation and comprising a multi-tone energy waveform associated with a second resource allocation, wherein the first resource allocation and the second resource allocation are based at least in part on the peak power value associated with the transmission time interval and the information associated with the peak-to-average power ratio; and
      transmit, during the transmission time interval, the multiplexed waveform to one or more wireless devices.

9. The radio unit of claim 8, wherein the one or more processors are individually or collectively further operable to execute the code to cause the radio unit to:

generate the peak-to-average power ratio for the data waveform and the initial resource allocation for the data waveform; and
generate, after generating the peak-to-average power ratio, the peak power value of the transmission time interval based at least in part on a power saturation value of a power amplifier and a power backoff value of the power amplifier.

10. The radio unit of claim 9, wherein the one or more processors are individually or collectively further operable to execute the code to cause the radio unit to:
apply a beamforming vector associated with the data waveform to one or more antennas of the radio unit, wherein generating the peak-to-average power ratio for the data waveform and the initial resource allocation for the data waveform occurs after and is based at least in part on applying the beamforming vector.

11. The radio unit of claim 10, wherein:
the peak-to-average power ratio comprises a respective value associated with each respective antenna of the one or more antennas of the radio unit, and
the multi-tone energy waveform comprises a respective energy waveform associated with each respective antenna of the one or more antennas of the radio unit.

12. The radio unit of claim 9, wherein the power backoff value of the power amplifier is based at least in part on a modulation and coding scheme associated with the data waveform.

13. The radio unit of claim 8, wherein the one or more processors are individually or collectively further operable to execute the code to cause the radio unit to:
perform, via a power amplifier of the radio unit, power amplification of the multiplexed waveform to a power value, wherein the power value satisfies the peak power value of the transmission time interval.

14. The radio unit of claim 8, wherein the one or more processors are individually or collectively further operable to execute the code to cause the radio unit to:
transmit, to the one or more wireless devices, control signaling that indicates the first resource allocation for the data waveform for the transmission time interval.

15. The radio unit of claim 14, wherein, to transmit the control signaling, the one or more processors are individually or collectively operable to execute the code to cause the radio unit to:
transmit the control signaling via a physical downlink control channel grant, an passive wireless device grant, or both.

16. The radio unit of claim 8, wherein the multi-tone energy waveform is energy harvesting for a passive wireless device and the data waveform is for a user equipment (UE).

17. The radio unit of claim 8, wherein:
the multi-tone energy waveform comprises multiple sinusoidal waveforms for energy harvesting for a passive wireless device, and
each sinusoidal waveform of the multiple sinusoidal waveforms comprises a respective frequency associated with a respective resource of the second resource allocation.

18. The radio unit of claim 8, wherein the transmission time interval is a duration of a single symbol.

19. A method for wireless communications, at a distributed unit, comprising:
outputting, to a radio unit, a data waveform and an initial resource allocation for the data waveform, the initial resource allocation spanning a set of resource blocks within a transmission time interval;
obtaining, from the radio unit, a peak power value associated with the transmission time interval and information associated with a peak-to-average power ratio that is based at least in part on the data waveform and the initial resource allocation for the data waveform; and
outputting, to the radio unit, a multiplexed waveform for the transmission time interval comprising the data waveform associated with a first resource allocation and comprising a multi-tone energy waveform associated with a second resource allocation, wherein the first resource allocation and the second resource allocation are based at least in part on the peak power value associated with the transmission time interval and the information associated with the peak-to-average power ratio.

20. The method of claim 19, further comprising:
allocating a first quantity of resource blocks of the set of resource blocks as the initial resource allocation for the data waveform, wherein the first quantity of resource blocks is based at least in part on a quantity of data for the data waveform, a modulation and coding scheme associated with the data waveform, or both; and
allocating a second quantity of resource blocks of the set of resource blocks as the second resource allocation for the multi-tone energy waveform, wherein the second quantity of resource blocks is based at least in part on the peak power value associated with the transmission time interval and the information associated with the peak-to-average power ratio.

21. The method of claim 20, wherein the initial resource allocation is allocated as the first resource allocation based at least in part on a sum of the first quantity of resource blocks and the second quantity of resource blocks satisfying a threshold quantity of resource blocks of the set of resource blocks.

22. The method of claim 20, wherein a sum of the first quantity of resource blocks and the second quantity of resource blocks is less than a threshold quantity of resource blocks of the set of resource blocks, the method further comprising:
allocating both the first quantity of resource blocks of the initial resource allocation of the data waveform and a remaining quantity of resource blocks of the set of resource blocks as the first resource allocation of the data waveform.

23. The method of claim 19, wherein the multi-tone energy waveform is energy harvesting for a passive wireless device and the data waveform is for a user equipment (UE).

24. The method of claim 19, wherein:
the multi-tone energy waveform comprises multiple sinusoidal waveforms for energy harvesting for a passive wireless device, and
each sinusoidal waveform of the multiple sinusoidal waveforms comprises a respective frequency associated with a respective resource of the second resource allocation.

25. The method of claim 19, wherein the transmission time interval is a duration of a single symbol.

26. A method for wireless communications, at a radio unit, comprising:
receiving, from a distributed unit, a data waveform and an initial resource allocation for the data waveform, the initial resource allocation spanning a set of resource blocks within a transmission time interval;
transmitting, to the distributed unit, a peak power value associated with the transmission time interval and information associated with a peak-to-average power ratio that is based at least in part on the data waveform and the initial resource allocation for the data waveform;

receiving, from the distributed unit, a multiplexed waveform for the transmission time interval comprising the data waveform associated with a first resource allocation and comprising a multi-tone energy waveform associated with a second resource allocation, wherein the first resource allocation and the second resource allocation are based at least in part on the peak power value associated with the transmission time interval and the information associated with the peak-to-average power ratio; and transmitting, during the transmission time interval, the multiplexed waveform to one or more wireless devices.

27. The method of claim 26, further comprising:

generating the peak-to-average power ratio for the data waveform and the initial resource allocation for the data waveform; and generating, after generating the peak-to-average power ratio, the peak power value of the transmission time interval based at least in part on a power saturation value of a power amplifier and a power backoff value of the power amplifier.

28. The method of claim 27, further comprising:

applying a beamforming vector associated with the data waveform to one or more antennas of the radio unit, wherein generating the peak-to-average power ratio for the data waveform and the initial resource allocation for the data waveform occurs after and is based at least in part on applying the beamforming vector.

29. The method of claim 28, wherein:

the peak-to-average power ratio comprises a respective value associated with each respective antenna of the one or more antennas of the radio unit, and the multi-tone energy waveform comprises a respective energy waveform associated with each respective antenna of the one or more antennas of the radio unit.

30. The method of claim 27, wherein the power backoff value of the power amplifier is based at least in part on a modulation and coding scheme associated with the data waveform.

* * * * *